United States Patent
Saeki et al.

(10) Patent No.: US 6,320,518 B2
(45) Date of Patent: Nov. 20, 2001

(54) MAP DATA TRANSMITTING APPARATUS, AND COMPUTER READABLE RECORDING MEDIUM HAVING COMPUTER READABLE PROGRAMS STORED THEREIN FOR CAUSING COMPUTER TO PERFORM MAP DATA TRANSMITTING METHOD

(75) Inventors: Toshiaki Saeki; Ken-ichi Saitou, both of Tokyo (JP)

(73) Assignee: Mitsubishi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/737,937

(22) Filed: Dec. 18, 2000

(30) Foreign Application Priority Data

Mar. 1, 2000 (JP) .................................................. 12-055177

(51) Int. Cl.[7] ................................................. G08G 1/123
(52) U.S. Cl. ......................... 340/995; 340/990; 701/208; 701/211
(58) Field of Search .................................. 340/995, 990, 340/988, 989, 991, 992, 993; 701/200, 208, 209, 211, 212, 213

(56) References Cited

U.S. PATENT DOCUMENTS

| | | | | |
|---|---|---|---|---|
| 5,157,614 | * | 10/1992 | Kashiwazaki et al. | 701/200 |
| 5,168,452 | * | 12/1992 | Yamada et al. | 701/202 |
| 5,285,391 | * | 2/1994 | Smith, Jr. et al. | 701/200 |
| 5,689,431 | * | 11/1997 | Rudow et al. | 701/213 |
| 5,832,187 | * | 11/1998 | Pedersen et al. | 706/45 |
| 5,883,586 | * | 3/1999 | Tran et al. | 340/945 |
| 5,938,721 | * | 8/1999 | Dussell et al. | 701/211 |
| 6,097,316 | * | 8/2000 | Liaw et al. | 340/988 |
| 6,163,749 | * | 12/2000 | McDonough et al. | 701/208 |
| 6,208,918 | * | 3/2001 | Ando et al. | 701/35 |

FOREIGN PATENT DOCUMENTS

| | | |
|---|---|---|
| 1074042 | 10/1996 | (JP) . |
| 10300499 | 5/1997 | (JP) . |
| 11120330 | 10/1997 | (JP) . |

* cited by examiner

Primary Examiner—Benjamin C. Lee

(57) ABSTRACT

The present invention aims to implement a flexible transmission of the map data according to the performance of the mobile terminal of the receiver, the moving speed of the mobile terminal, or the communicating speed of the communication media. The dynamic priority setting unit determines and sets the priority to each of the parts constituting the map data with considering an improvement of readability of the guiding route, a necessity of real-time display, the static priority previously assigned to each part, and the user's request. The data amount determining unit calculates a total transmittable amount of map data according to the performance of the mobile terminal of the receiver, the moving speed of the mobile terminal, the communicating speed of the communication media and so on. The data amount determining unit also dynamically updates the total transmittable amount of map data according to change of the status. The parts selecting unit selects the parts to be transmitted based on the priority, and the transmitting unit transmits the selected part.

22 Claims, 18 Drawing Sheets

Fig. 2A

A (LINE INFORMATION)
  (1) PRIORITY
  (2) NODE LIST
  (3) ATTRIBUTE INFORMATION

B (POINT INFORMATION)
  (1) PRIORITY
  (2) LOCATION
  (3) ATTRIBUTE INFORMATION

C (PLANE INFORMATION)
  (1) PRIORITY
  (2) LOCATION AREA
  (3) ATTRIBUTE INFORMATION

Fig. 2B

STATIC PRIORITY: HIGH ← → LOW

| | PART |
|---|---|
| [1] ROAD | |
| [1-1] EXPRESSWAY | : A1, A2, A3, A4 |
| [1-2] TOLL ROAD | : A5 |
| [1-3] NATIONAL ROAD | : A6, A7, A8...A14 |
| [1-4] PREFECTURAL ROAD | : A15, A16...A25 |
| [1-5] COMMON ROAD | : A26, A27...A35 |
| [1-6] LOCAL ROAD | : A36, A37 |
| [2] TRAFFIC LIGHT | : B1, B2, B3 |
| [3] NAME/LETTERS | : B4, B5 |
| [4] PARKING LOT | : B6, B7, B8 |
| [5] BUILDINGS/FACILITIES | : B9, B10 |
| [6] RAILROAD/MONORAIL | : A38, A39 |
| [7] MAP SIGN | : B11, B12, B13 |
| [8] BACKGROUND | : C1, C2 |

Fig. 3A

HIGH
PRIORITY

| (1) ROAD CONSTITUTING ROUTE |
| (2) ROAD CROSSING ROUTE |
| (3) ROAD WHICH IS NEAR ROUTE BUT DOES NOT CROSS ROUTE |
| (4) TRAFFIC LIGHT ON ROUTE |
| (5) BUILDING PARKING LOT, FACILITIES, GAS STATION, RESTAURANT, CONVENIENCE STORE, RAILROAD, MONORAIL AROUND ROUTE |
| (6) NAME OF ROAD, INTERSECTION ON ROUTE, NAME OF BUILDING/FACILITIES ALONG ROUTE |
| (7) TRAFFIC LIGHT NEAR ROUTE OR TRAFFIC LIGHT WHICH IS ON ROAD CROSSING ROUTE AND IS LOCATED NEAR ROUTE |
| (8) BACKGROUND INFORMATION AROUND ROUTE |
| (9) NAME OF ROAD, INTERSECTION NEAR ROUTE, NAME OF BUILDING/FACILITIES AROUND ROAD NEAR ROUTE |

LOW

Fig. 3B

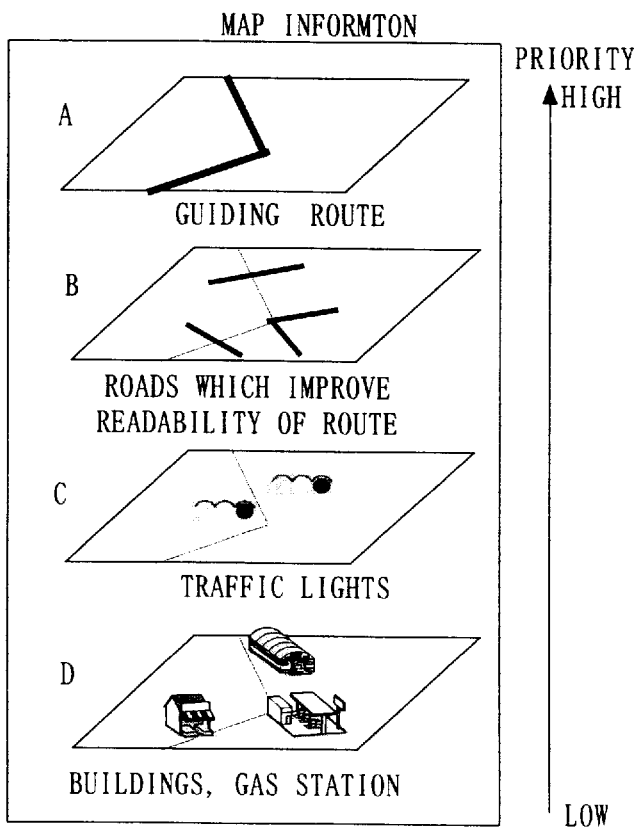

Fig. 4

| | | PRIORITY |
|---|---|---|
| (1) ROAD CONSTITUTING ROUTE | A6,A7,A8,A16,A19,A20,A21 | 30 |
| (2) ROAD CROSSING ROUTE | A10,A11,A15,A17,A22 | 29 |
| (3) ROAD WHICH IS NEAR ROUTE BUT DOES NOT CROSS ROUTE | A9 | 28 |
| (4) TRAFFIC LIGHT ON ROUTE | B2,B3 | 27 |
| (5) BUILDING, PARKING LOT, FACILITIES, GAS STATION, RESTAURANT, CONVENIENCE STORE, RAILROAD, MONORAIL ALONG ROUTE | B7,B8,B9,B10, | 26 |
| (6) NAME OF ROAD, INTERSECTION ON ROUTE, NAME OF BUILDING/FACILITIES AROUND ROUTE | | 25 |
| (7) TRAFFIC LIGHT NEAR ROUTE OR TRAFFIC LIGHT WHICH IS ON ROAD CROSSING ROUTE AND IS LOCATED NEAR ROUTE | B1 | 24 |
| (8) BACKGROUND INFORMATION AROUND ROUTE | | 23 |
| (9) NAME OF ROAD, INTERSECTION NEAR ROUTE, NAME OF BUILDING/FACILITIES AROUND ROAD NEAR ROUTE | | 22 |

HIGH ← PRIORITY → LOW

Fig. 5

| 0 ~ 10m | → | PRIORITY 20 |
| 10m ~ 50m | → | PRIORITY 19 |
| 50m ~ 100m | → | PRIORITY 18 |
| 100m ~ 200m | → | PRIORITY 17 |
| 200m ~ 500m | → | PRIORITY 16 |

Fig. 6

AFTER SETTING PRIORITIES OF PARTS ACCORDING TO PRIORITY SETTING STANDARD SHOWN IN PRIORITY SETTING TABLE ①, ADD PRIORITIES SHOWN IN PRIORITY SETTING TABLE ②

①PRIORITY SETTING TABLE BASED ON READABILITY OF ROUTE

| | PRIORITY |
|---|---|
| (1) ROAD CONSTITUTING ROUTE | 30 |
| (2) ROAD CROSSING ROUTE | 29 |
| (3) ROAD WHICH IS NEAR ROUTE BUT DOES NOT CROSS ROUTE | 28 |
| (4) TRAFFIC LIGHT ON ROUTE | 27 |
| (5) BUILDING, PARKING LOT, FACILITIES, GAS STATION, RESTAURANT, CONVENIENCE STORE, RAILROAD, MONORAIL ALONG ROUTE | 26 |
| (6) NAME OF ROAD, INTERSECTION ON ROUTE, NAME OF BUILDING/FACILITIES AROUND ROUTE | 25 |
| (7) TRAFFIC LIGHT NEAR ROUTE OR TRAFFIC LIGHT WHICH IS ON ROAD CROSSING ROUTE AND IS LOCATED NEAR ROUTE | 24 |
| (8) BACKGROUND INFORMATION AROUND ROUTE | 23 |
| (9) NAME OF ROAD, INTERSECTION NEAR ROUTE, NAME OF BUILDING/FACILITIES AROUND ROAD NEAR ROUTE | 22 |

②PRIORITY SETTING TABLE BASED ON DISTANCE FROM GUIDING ROUTE

| 0 ~ 10m | → PRIORITY 5 |
|---|---|
| 10m ~ 50m | → PRIORITY 4 |
| 50m ~ 100m | → PRIORITY 3 |
| 100m ~ 200m | → PRIORITY 2 |
| 200m ~ 500m | → PRIORITY 1 |

Fig. 8

| | PRIORITY |
|---|---|
| (1) GAS STATION LOCATED WITHIN RANGE OF EQUAL TO OR LESS THAN 1km FROM PRESENT LOCATION | 30 |
| (2) ROUTE TO GAS STATION LOCATED WITHIN RANGE OF EQUAL TO OR LESS THAN 1km FROM PRESENT LOCATION | 29 |
| (3) GAS STATION LOCATED WITHIN RANGE OF EQUAL TO OR MORE THAN 1km AND EQUAL TO OR LESS THAN 3km FROM PRESENT LOCATION | 28 |
| (4) ROUTE TO GAS STATION LOCATED WITHIN RANGE OF EQUAL TO OR MORE THAN 1km AND EQUAL TO OR LESS THAN 3km FROM PRESENT LOCATION | 27 |
| (5) GAS STATION LOCATED WITHIN RANGE OF EQUAL TO OR MORE THAN 3km AND EQUAL TO OR LESS THAN 5km FROM PRESENT LOCATION | 26 |
| (6) ROUTE TO GAS STATION LOCATED WITHIN RANGE OF EQUAL TO OR MORE THAN 3km AND EQUAL TO OR LESS THAN 5km FROM PRESENT LOCATION | 25 |
| (7) ROAD CONSTITUTING ROUTE | 24 |
| (8) ROAD CROSSING ROUTE | 23 |
| (9) ROAD WHICH IS NEAR ROUTE BUT DOES NOT CROSS ROUTE | 22 |
| (10) TRAFFIC LIGHT ON ROUTE | 21 |
| (11) BUILDING, PARKING LOT, FACILITIES, GAS STATION, RESTAURANT, CONVENIENCE STORE, RAILROAD, MONORAIL ALONG ROUTE | 20 |
| (12) NAME OF ROAD, INTERSECTION ON ROUTE, NAME OF BUILDING/FACILITIES AROUND ROUTE | 19 |
| (13) TRAFFIC LIGHT NEAR ROUTE OR TRAFFIC LIGHT WHICH IS ON ROAD CROSSING ROUTE AND IS LOCATED NEAR ROUTE | 18 |
| (14) BACKGROUND INFORMATION AROUND ROUTE | 17 |
| (15) NAME OF ROAD, INTERSECTION NEAR ROUTE, NAME OF BUILDING/FACILITIES AROUND ROAD NEAR ROUTE | 16 |

HIGH ◄——— PRIORITY ———► LOW

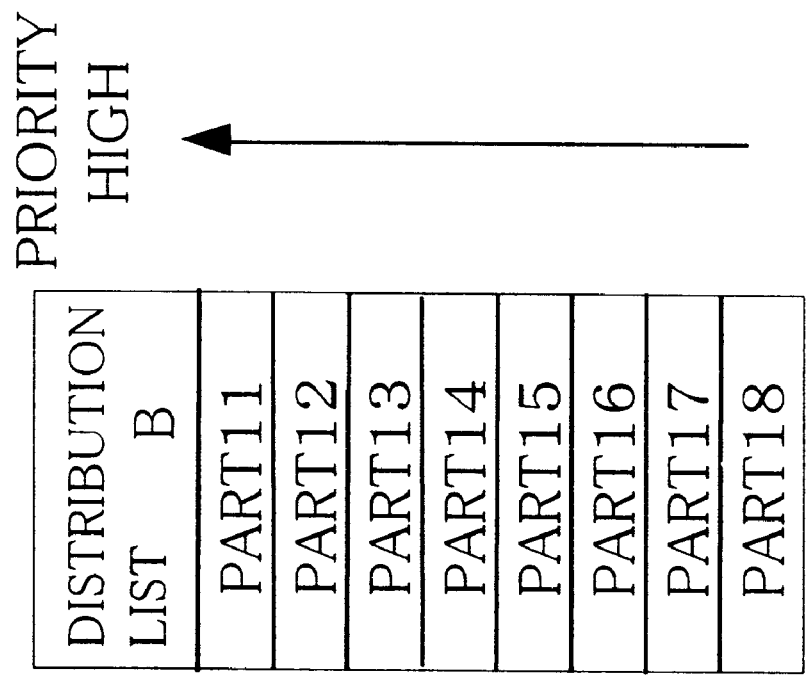
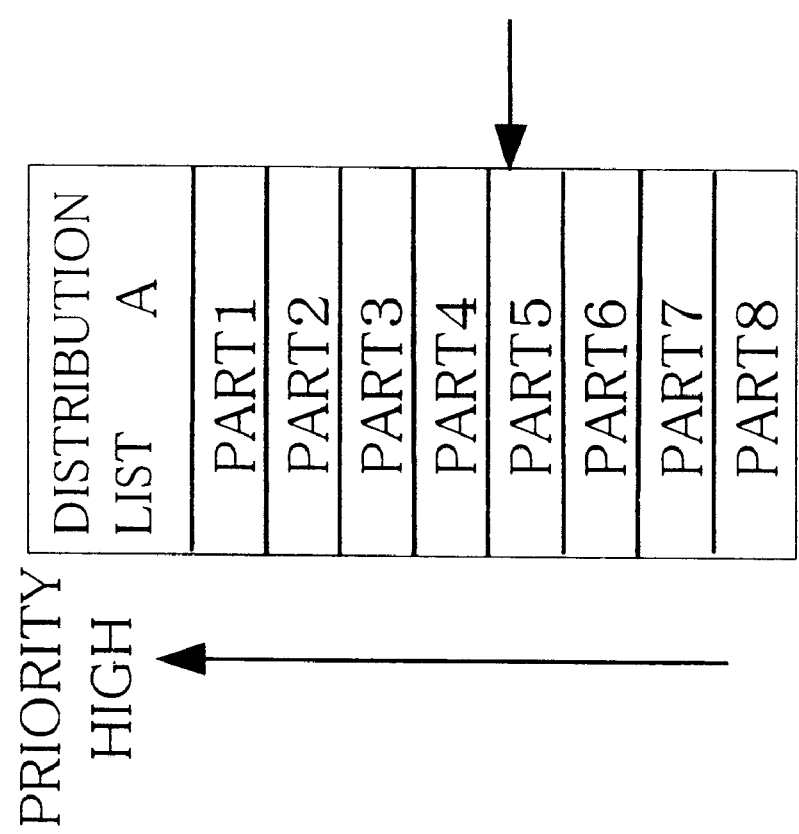

MAP DATA TRANSMITTING APPARATUS, AND COMPUTER READABLE RECORDING MEDIUM HAVING COMPUTER READABLE PROGRAMS STORED THEREIN FOR CAUSING COMPUTER TO PERFORM MAP DATA TRANSMITTING METHOD

BACKGROUND OF THE INVENTION

1. Field of the Invention

The present invention relates to, for example, an apparatus, a method and a recording medium storing the method for distributing map information to one or plural mobile terminals through radio communication.

2. Description of the Related Art

Related Art 1

FIG. 13 is a block diagram showing a function of a conventional deformed map forming apparatus and a map information providing system using the deformed map disclosed in the Japanese Unexamined Patent Publication No. HEI 10-74042.

The deformed map forming apparatus includes a target relating means 106 and deformation means 107 through 112. The target relating means 106 relates information of a certain target stored in vector map data 101, which stores information of outline of targets and roads, to roads around the target so that the information of the target can be moved according to the transition of the road. The deformation means 107 through 112 perform deformation process of map data in which a target is related to roads by the target relating means. Since the target is related to the roads, a relationship among the target and the roads can be kept even if the map is deformed.

In the deformed map forming apparatus, the following means are provided as the deformation means: a route extracting means extracting only area along the searched route; a target neighborhood reforming means reforming the map of the neighborhood of a certain target by making a road around the target of the map longer so as to prevent the target from being overlapped by another target; a non-target neighborhood reforming means omitting road data which has no relation with the target; an angle modifying means modifying an angle at which lines cross each other; a crossing point moving means moving a consisting point of a line to a crossing point of meshes of the vector map; a straight line adjusting means adjusting a line to a straight line connected with the crossing point of meshes of the vector map; a map area setting means dynamically determining an extracting area of map according to the number of target; a road omitting means omitting road narrower than a predetermined width; another straight line adjusting means adjusting to a straight line two lines which cross each other by a small angle; a road shortening means shortening a long straight road; and a target omitting means omitting a target from the map area so that targets should not be overlapped. The deformed map forming apparatus regards relative relationship of the location and readability more important than the precision of the location. The apparatus focuses a map into an area along the searched route and the roads related to the area are deformed, and the apparatus omits a road which is not related to the target so as to simplify the map. When targets are overlapped, some of the targets are omitted according to a priority for displaying the targets.

Further, the map information providing system is configured by a portable terminal which is small, light and having radio communication function and an information provider providing such as map information in response to a search request from the portable terminal. The information provider includes a searching means consisting of an information storage area storing the map information, a searching means searching necessary information from the information storage area, the deformed map forming apparatus automatically generating the deformed map by simplifying the map information searched by the searching means, a communication means communicating with the portable terminal by radio, and a search controlling means analyzing the search request received via the communication means, generating a search command sequence for the searching means, transmitting the map information searched by the searching means to the deformed map forming apparatus, and transmitting the deformed map drawn by the deformed map forming apparatus to the portable terminal via the communication means.

The map information providing system reduces an amount of data by deforming the map so that the system enables:

1) to display readable map even on a display of small portable terminal with small display size, small capacity of memory, small capacity of disk and so on; and
2) to distribute the map information to the portable terminal easily via the radio communication function having low and unstable communication performance.

Related Art 2

FIG. 14 shows a block diagram showing a function of a conventional graphic data managing apparatus consisting of a layered data structure disclosed in the Japanese Unexamined Patent Publication No. HEI 11-120330.

In the graphic data managing apparatus, on managing the graphic data to be displayed with overlaying figures on each layer, the layers are classified based on the attribute information assigned to each graphic data, which enables to easily and rapidly move the figure from one layer to the other layer corresponding to the change of attribute information when the attribution of the figure is changed.

PROBLEMS TO BE SOLVED BY THE INVENTION

There are some problems to be solved in the deformed map forming apparatus/map information providing system according to the first related art:

1) When communication infra structure (communication media) used for distributing the map is changed, an amount of data transmitted within a time is also changed because performance/characteristics of each communication media, namely, the communication speed and the communication band is different for each communication media. Accordingly, it is impossible to draw/modify the deformed map dynamically adaptable to the performance of various communication media.
2) Further, since the deformation of the map reacting dynamically to traffic status of the communication media cannot be performed, a throughput of the network is much reduced once the traffic is congested. Therefore, the reduction of the throughput defects the map distribution service, for example, the distributing speed of the map is extremely decreased. On the other hand, when the deformation of the map is performed previously assuming the traffic status of the network, the apparatus cannot change to increase the precision of the map to be displayed even if the network traffic becomes low, which fails to satisfy the user.
3) Yet further, since the map data is distributed through the channel with a low communication speed and a narrow communication band, it is impossible to transmit efficiently a large amount of map data.

In the second related art, the process will be so complex that the processing speed decreases extremely when the classification of layer is varied, the mapping is updated to different layer structure, new attribute information is assigned to each layer, and each layer is processed in a different way based on the new attribute information in accordance with each phase in which the map information is used.

SUMMARY OF THE INVENTION

The present invention is provided to solve the above problems and aims to obtain a map information distributing apparatus, a map information distributing method and a recording medium storing the method, which can efficiently distribute detailed map data to the portable terminal through the radio communication with a low communication speed, a narrow communication band, and having an unstability of the communication, such as interruption of the communication.

According to the present invention, a map data transmitting apparatus for transmitting map data includes:

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit includes a plurality of the priority setting tables for specifying a standard for setting the priority, selects one of the plurality of the priority setting tables and dynamically sets the priority of transmitting sequence to each of the figure parts according to the priority table selected.

According to another aspect of the present invention, a map data transmitting apparatus for transmitting map data includes:

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit includes a plurality of the priority setting tables for specifying a standard for setting the priority, arbitrarily combines at least two of the plurality of the priority setting tables and dynamically sets the priority of transmitting sequence to each of the figure parts.

According to another aspect of the present invention, a map data transmitting apparatus for transmitting map data for guiding a route of a moving object comprising:

a route guiding request detecting unit for detecting a request for guiding the route from the moving object;

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of transmitting sequence to each of the figure parts according to the request for guiding the route from the moving object in case the route guiding request detecting unit detects the request for guiding the route.

According to another aspect of the present invention, a map data transmitting apparatus for transmitting map data for guiding a route of a moving object includes:

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein:

the transmitting unit comprises a traffic status detecting unit for detecting a traffic status of a transmission channel for transmitting the figure parts to the moving object by the transmitting unit; and the priority setting unit dynamically sets the priority of transmitting sequence to each of the figure parts according to a change of the traffic status in case the traffic status of the transmission channel detected by the traffic status detecting unit is changed.

According to another aspect of the present invention, a map data transmitting apparatus for transmitting map data for guiding a route of a moving object includes:

a moving speed detecting unit for detecting a moving speed of the moving object;

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of transmitting sequence to each of the figure parts according to a change of the moving speed in case the moving speed of the moving object detected by the moving speed detecting unit is changed.

According to another aspect of the present invention, a map data transmitting apparatus for transmitting map data for guiding a route of a moving object includes:

a communication media detecting unit for detecting a kind of communication media of the moving object;

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of the transmitting sequence to each of the figure parts according to a change of the kind of communication media in case the kind of communication media of the moving object detected by the communication media detecting unit is changed.

According to another aspect of the present invention, a map data transmitting apparatus for transmitting map data for guiding a route of a moving object includes:

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of transmitting sequence to each of the figure parts according to a priority setting table based on readability of route for setting a higher priority to a figure part which more improves readability of guiding route of the moving object.

According to another aspect of the present invention, a map data transmitting apparatus for transmitting map data for guiding a route of a moving object includes:

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of transmitting sequence to each of the figure parts according to a priority setting table based on distance from guiding route for setting a higher priority to a figure part which is located closer to the guiding route of the moving object.

According to another aspect of the present invention, a map data transmitting apparatus for transmitting map data for guiding a route of a moving object includes:

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of transmitting sequence to each of the figure parts according to a priority setting table based on distance from specific point for setting a higher priority to a figure part which is located closer to the specific point in the map data.

According to another aspect of the present invention, a map data transmitting apparatus for transmitting map data includes:

a priority setting unit for setting a priority of transmitting sequence of the map data;

a transmitting unit for transmitting the map data by each of figure parts constituting the map data;

a data amount determining unit for determining a data amount which is a maximum value of transmittable amount of the data within a predetermined time; and a parts selecting unit for selecting the figure parts to be transmitted according to the priority within the data amount, and wherein the transmitting unit transmits the figure parts selected by the parts selecting unit in the transmitting sequence according to the priority.

According to another aspect of the present invention, a computer readable storage medium having a computer readable program stored therein for causing a computer to perform a map data transmitting method, wherein the method includes:

dividing the map data into figure parts constituting the map data and storing the figure parts included in the map data;

setting a priority of transmitting sequence to each of the figure parts stored at the storing; and transmitting the figure parts stored at the storing in the transmitting sequence according to the priority set at the setting, and wherein the setting includes a priority setting table for specifying a standard for setting the priority and dynamically sets the priority of transmitting sequence to each of the figure parts according to the priority setting table.

According to another aspect of the present invention, a computer readable storage medium having a computer readable program stored therein for causing a computer to perform a map data transmitting method for transmitting the map data to a moving object for guiding a route of the moving object, wherein the method includes:

dividing the map data into figure parts constituting the map data and storing the figure parts included in the map data;

setting a priority of transmitting sequence to each of the figure parts stored at the storing; and transmitting the figure parts stored at the storing in the transmitting sequence according to the priority set at the setting, and wherein the setting sets a higher priority to a figure part for a point which is easier to access from the present location of the moving object.

These and other objects and features of the invention will be better understood by reference to the detailed description which follows taken together with the drawings in which like elements are referred to by like designations throughout the several views.

BRIEF DESCRIPTION OF THE DRAWINGS

In the drawings.

FIGS. 2A and 2B explain a static priority setting table;

FIGS. 3A and 3B explain a priority setting table based on readability of route;

FIG. 4 shows the priority setting table, in which parts are assigned to each priority;

FIG. 5 shows a priority setting table based on distance from guiding route;

FIG. 6 shows a priority setting procedure, in which the priority is set according to plural priority setting tables combined;

FIG. 8 shows the priority setting table based on readability of route, in which the user's request is reflected;

FIGS. 18A and 18B show the distribution lists before scrolling and after scrolling.

DESCRIPTION OF THE PREFERRED EMBODIMENT

Embodiment 1

Figure 1:
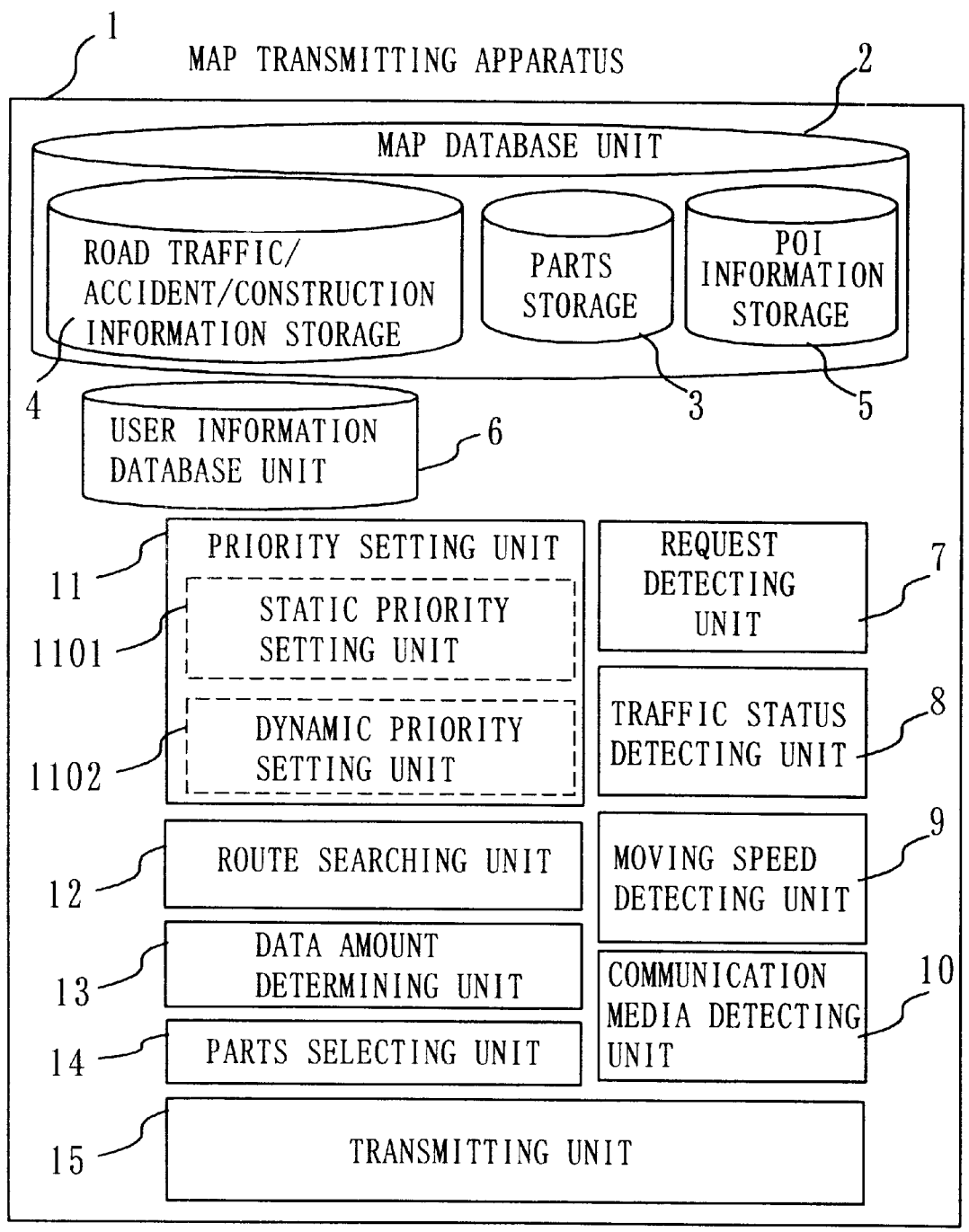
FIG. 1 is a functional block drawing showing a map data transmitting apparatus in relation to the present invention.

FIG. 1 is a block diagram showing function of a map transmitting apparatus in relation to the first embodiment of the invention.

As shown in FIG. 1, a reference numeral 1 shows a map transmitting apparatus according to the present invention. A reference numeral 2 shows a map database unit including a parts storage 3 and a storage 4 for storing road traffic/accident/construction information and a POI (Point Of Interest) information storage 5. The parts storage 3 stores parts of each figure (hereinafter, simply referred to as "parts") constituting the map data. The storage 4 stores information relating traffic jam, traffic accident, construction on the road and so on. The POI information storage stores POI (Point Of Interest) information. 6 shows a user information database unit which stores a performance of a mobile terminal used by the user (such as memory size for storing map information, performance of CPU, display size), a moving speed of the mobile terminal, a communication performance such as a communication speed, communication band of the communication media used for transmitting the map data. A request detecting unit 7 functions as a route guiding request detecting unit and as a map data changing request detecting unit, which respectively receive the route guiding request and a scroll request (map data changing request) from the user (mobile terminal). A traffic status detecting unit 8 detects a traffic status of the transmitting channel between the map data transmitting apparatus and the mobile terminal. A moving speed detecting unit 9 detects a moving speed of the mobile terminal. A communication media detecting unit 10 detects a kind of the communication media used by the mobile terminal. A priority setting unit 11 determines a priority of transmitting sequence of the parts and includes a static priority setting unit 1101 and a dynamic priority setting unit 1102. A route searching unit 12 searches a route to the destination according to the route guiding request from the user. A data amount determining unit 13 determines a maximum amount of the map data that the map transmitting apparatus can transmit in a certain time unit (total transmittable amount of map data). A parts selecting unit 14 selects parts to be transmitted according to the priority set by the priority setting unit within the total transmittable amount of map data determined by the data amount determining unit. A transmitting unit 15 transmits the parts selected by the parts selecting unit according to the priority of transmitting order.

The static priority setting unit 1101 included in the priority setting unit 11 classifies the parts into group units based on the characteristics of each part, and sets the priority for each group entirely. Namely, the same priority is previously set to all parts in the same group. This priority is called as a static priority, and setting the static priority to each group is called a layering of the map.

Each time of newly setting the guiding route or resetting the guiding route, the dynamic priority setting unit 1102 included in the priority setting unit 11 extracts the parts relating the guiding route, the parts which improves readability and so on out of the parts registered in the map database unit. The dynamic priority setting unit 1102 dynamically sets the priority based on the request from the user, the necessity for improving the readability of the route or for the necessity of the display, and further, the static priority of each group which has been previously set.

First, function of the map database unit will be explained.

As described above, the map database unit 2 stores map data by dividing the map data into parts constituting the map data.

Figure 9:
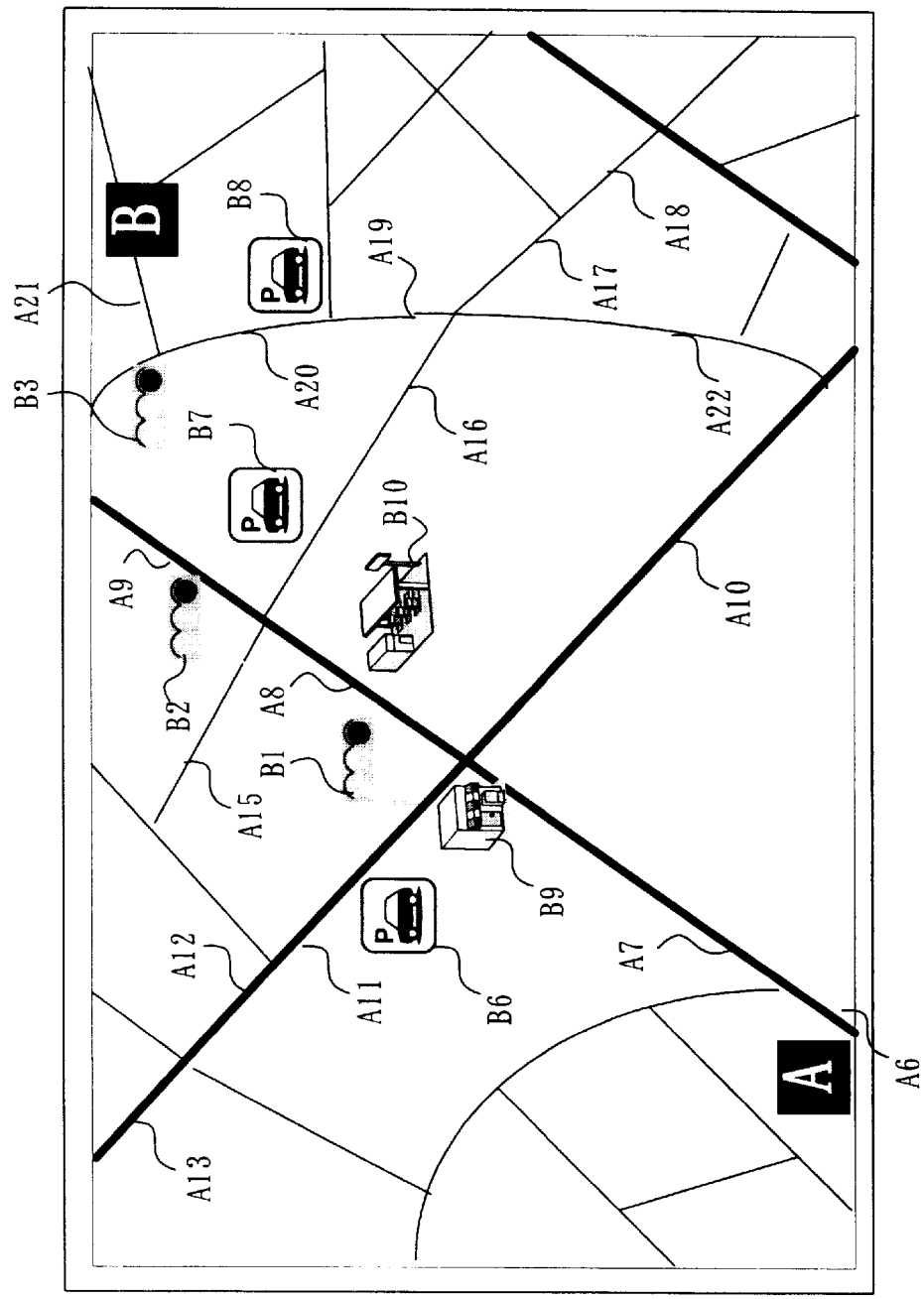
FIG. 9 shows each part constituting the map data.

Here, the part means a figure showing each road or each of facilities which constitute the map data. For example, in the map data shown in FIG. 9, national roads A6, A7, traffic lights B1 through B3, parking lots B6 through B8, building facilities B9, B10, and so on are called the parts.

The map database unit stores the parts constituting the map as shown in FIG. 2B by specifying the parts with group units of: an expressway; a toll road; a national road; a prefectural road; a common road; a local road; a traffic light; a name/letters; a parking lot; a building/facilities; a railroad/monorail; a map sign; and background. This specification is performed previously for each purpose of utilizing the map by the static priority setting unit 1101, and a static priority is set for each group as a default priority. Namely, FIG. 2B shows a static priority setting table which is a priority setting table for each group. Signs such as A1, A2, B1, B2, C1 show the constituting parts of the map and are included in each group. Here, A of the national roads A6, A7, etc. means line information, which includes various roads (express way, etc.), a railroad and so on. B of the traffic lights B1 through B3, and the parking lots B6 through B8 means point information and the name/letters shows information of the name such as a small section of address and a name of park. C of the background C1, C2 shows plane information such as notation of railroad station.

Each of the parts is registered with combined information as shown in FIG. 2A. A type (line information) includes: (1) priority (static priority); (2) supplement node list (coordinate information such as latitude and longitude showing a course of the road); and (3) attribute information (such as name of the road). B type (point information) includes: (1) priority (static priority); (2) location of building (coordinate information such as latitude and longitude showing a location of the building); and (3) attribute information (such as name of the building). C type (plane information) includes: (1) priority (static priority); (2) location area (coordinate information such as latitude and longitude showing a location of a station); (3) attribute information (such as name of the station).

As described above, in the map database unit, each of the parts is registered based on the static priority for the group set by the static priority setting unit 1101.

In case of FIG. 2B, since the highest priorities are set to the expressways A1 through A4, the data transmission always starts with the parts of expressways A1 through A4, which does not mean flexible transmission of the map data.

In the following, an operation will be explained, in which a priority is dynamically set with considering the status of the mobile terminal and so on by the dynamic priority setting unit 1102.

First, an operation of the dynamic priority setting unit 1102 will be explained in case of newly setting a guiding route or resetting the guiding route which has been set once.

The request detecting unit 7 receives the route guiding request from the user (mobile terminal). The route guiding request includes a search request of a route between the present location of the user (mobile terminal) and the destination and a distribution request of a map which is required for guiding the route. At this time, the request detecting unit 7 also receives various requesting condition such as a communication media used by the user (mobile terminal), a map requested by the mobile terminal (a relay point, means of transportation which the user wants to use, a road, and so on), POI (Point Of Interest) information, the memory capacity in which the mobile terminal can register and store the received data, and the moving speed of the mobile terminal. Then, the request detecting unit 7 registers the above received information in the user information database unit 6.

Next, the route searching unit 12 searches the route based on the route guiding request from the mobile terminal. After the route searching unit 12 has searched the route, the parts selecting unit 14 extracts the parts which constitute the guiding route and the map information related to the guiding route (information about signal lights, facilities, name data, roads which cross the guiding route and so on). The parts selecting unit 14 further extracts the parts which match with a priority setting standard of the priority setting table used by the dynamic priority setting unit 1102 out of the above extracted parts. And then, the dynamic priority setting unit 1102 sets the dynamic priority for each of the further extracted parts.

The dynamic priority setting unit 1102 selects a most suitable table out of plural priority setting tables based on the communication media, the memory capacity of the mobile terminal, the moving speed of the mobile terminal and so on registered in the user information database unit. The priority setting table is a table which shows a priority setting standard for dynamically setting the priority by the dynamic priority setting unit 1102.

For example, when the mobile terminal is a terminal having small capacity of memory such as a cellular telephone, a high real-timeliness is required for the data transmission as explained above. Further, when the moving speed of the mobile terminal is high, the high real-timeliness is also required.

In this way, the real-timeliness is different for various condition of the mobile terminal. The dynamic priority setting unit 1102 dynamically modifies the priority so as to transmit each of the parts in the sequence of the transmission which is the most suitable for the performance or the receiving environment of the mobile terminal.

The parts selecting unit 14 extracts the part matching the priority setting standard of the priority setting table out of the parts which constitute the guiding route and the map data related to the guiding route.

In this embodiment, an example case will be explained where a priority setting table based on readability of route is used for the priority setting table.

The priority setting table based on readability of route specifies a standard and rule for setting a higher priority to the guiding route and a road, facilities, etc. which improve the readability of the guiding route. Namely, the priority setting table shows a standard of displaying priority such as to omit a part having the lower priority in the process of producing a deformed map, or to determine a priority when plural elements such as facilities or a road are overlapped.

When the traffic becomes congested as described later, the amount of data which the map data transmitting apparatus can transmit to the mobile terminal will be limited. If the parts are transmitted according to the static priority within the limited data amount, it will be difficult to distribute the readable map data to the user, for example, the road, which should be displayed for guiding the present route, might be omitted, whereas the road, which should be omitted, will be displayed. Consequently, the priority setting table based on readability of route shows a priority setting standard for displaying the most readable map within a certain amount of data.

The following is a concrete example of the priority setting standard as shown in FIG. 3:
(1) a road constituting the route;
(2) a road crossing the route;
(3) a road which is near the route but does not cross the route;
(4) a traffic light on the route;
(5) a building, a parking lot, facilities, a gas stand, a restaurant, a convenience store, a railroad, a monorail along the route;
(6) a name of a road and an intersection on the route, a name of a building/facilities around the route;
(7) a traffic light near the route or a traffic light which is on the road crossing the route and is located near the route;
(8) background information around the route; and
(9) a name of a road and an intersection near the route, a name of a building/facilities around the road near the route.

Figure 10:
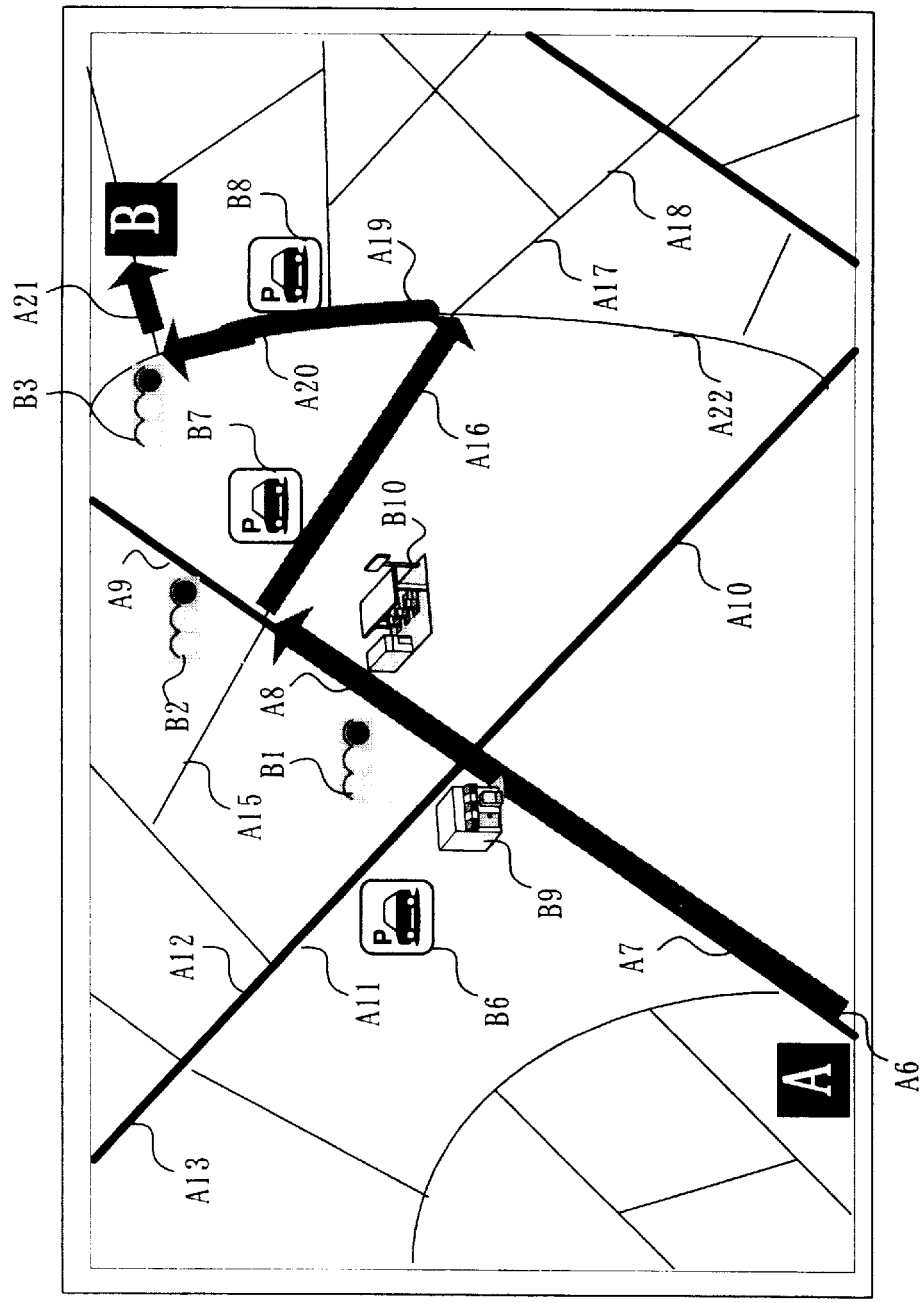
FIG. 10 shows an image drawing of the map data, in which the route has been set.

For example, it is assumed that the priority setting table based on readability of route shown in FIG. 3 is selected when the map data, in which the route is set as shown in FIG. 10, is requested to transmit. In this case, the parts selecting unit 14 extracts parts included in FIG. 10 out of the parts stored in the parts storage 3. Further, the parts selecting unit 14 extracts parts which match each of the groups (1) through (9) shown in FIG. 3 out of the parts included in FIG. 10, and the dynamic priority setting unit 1102 assigns the extracted parts to the corresponding group. FIG. 4 shows a result of assignment of each of the parts in FIG. 10 to each of the corresponding group. Namely, national roads A6, A7, A8, prefectural roads A16, A19, A20, A21 correspond to the group (1) a road configuring the route of the priority setting table, and the highest priority is set to these parts. That is, the prefectural roads A16 through A21 are assigned the highest priority in FIG. 4, while the prefectural roads do not have high priority in the static priority setting table shown in FIG. 2B.

In case of setting a priority by the dynamic priority setting unit 1102, the priority for each part varies according to the performance of the communication terminal or the set guiding route. This is different from setting a priority by the static priority setting unit which determines the priority fixed for group unit. For example, when the mobile terminal is out of the set route or there is a traffic jam, the set route should be reset. Even in such a case, an effective deformed map can be displayed corresponding to the newly set route.

In the above example, the priority is set to the parts, to which the static priority has been set, using the priority setting table based on readability of route (FIG. 3).

For example, the priority is determined according to the static priority setting table (FIG. 2) for parts, which do not belong to any group included in the priority setting table based on readability of route (FIG. 3), after setting the priority using the priority setting table based on readability of route.

Further, the priority can be set in another way: the number of parts to which the priority is set by the static priority is previously determined; and the priority is set to the parts, whose number is a difference of subtracting the above previously determined number from the total number of parts included in FIG. 10, using the priority setting table based on readability of route. Yet further, the priority can be set using the priority setting table based on readability of route after the priority is set for all the parts of the map by the static priority setting table.

The priority is dynamically set using the priority setting table based on readability of route as described above, and next, the maximum amount of map data (total transmittable amount of map data) transmittable within a time unit is determined by the data amount determining unit 13. The data amount determining unit 13 calculates a total transmittable amount of map data with considering the user information registered in the user information database unit 6, the user information includes the performance of the mobile terminal which receives the data (such as the memory size for storing the map information, CPU performance, display size), the moving speed of the mobile terminal, the communication speed of the communication media used for transmission, and communication performance of the communication band.

The more the memory size for storing the map information and the CPU performance increases, the more it becomes possible for the mobile terminal to process even a large amount of map data such as the detailed map or the map data for guiding a long distance destination. Namely, the amount of map data to be transmitted can be increased within a certain period of time.

The communication performance such as the communication speed of the communication media and the communication band used for the transmission is increased, the amount of the map data to be transmitted within a certain period of time is also increased.

Further, the larger the display size of the mobile terminal and the moving speed of the mobile terminal, the more the amount of map data required for the mobile terminal within the time unit increases, and therefore, the amount of map data to be transmitted within the time unit should be further increased.

The total transmittable amount of map data determined by the data amount determining unit at this stage is the maximum amount of transmittable data when the traffic of the communication line is low and the performance of the mobile terminal and the moving speed of the mobile terminal remains the same as registered in the user information database unit 6.

Once the total transmittable amount of map data has been calculated, the data amount determining unit 13 updates the total transmittable amount of map data by modulating up or down the calculated total transmittable amount of map data every time when the traffic status, the moving speed of the mobile terminal and the communication media used by the mobile terminal respectively change. As a concrete operation, the data amount determining unit 13 updates the total transmittable amount of map data in response to each of changes detected respectively by the traffic status detecting unit 8, the moving speed detecting unit 9 and the communication media detecting unit 10.

Updating the total transmittable amount of map data means recalculating the total transmittable amount of map data of the parts which has not been transmitted yet.

For example, when the network traffic becomes heavy, namely, the network becomes crowded, the total transmittable amount of map data is updated to smaller than the total transmittable amount of map data which has been set at first. The more the traffic becomes heavy, the smaller the total transmittable amount of map data should be set.

On the contrary, when the network traffic becomes light, namely, the network becomes less crowded, the total transmittable amount of map data can be increased up to the total transmittable amount of map data which has been calculated at first as an upper limit. The lighter the traffic becomes, the more the total transmittable amount of map data increases.

When the moving speed of the mobile terminal increases, the display of the mobile terminal should be frequently updated, which requires transmitting a necessary amount of data within a shorter time period. Accordingly, the amount of map data to be transmitted to the mobile terminal within a unit time becomes larger when the moving speed of the mobile terminal increases. At this time, the data amount determining unit should increase the total transmittable amount of map data. However, when the total transmittable amount of map data exceeds a predetermined threshold value, namely, when the transmission of the data cannot catch up with the update of the display, the data amount determining unit 13 decreases the total transmittable amount of map data so that only the minimum parts required for guiding the route should be certainly received at the mobile terminal.

Afterwards, when the mobile terminal decreases the moving speed, the data amount determining unit gradually increases the total transmittable amount of map data. Further, when the total transmittable amount of map data lowers the predetermined threshold value, it means that the data transmission surpasses the update of display. At this time, the data amount determining unit decreases the total transmittable amount of map data.

Once the data amount determining unit 13 determines the total transmittable amount of map data as described above, the parts selecting unit 14 starts to select the parts required for the map data to be transmitted.

The parts selecting unit 14 selects the part sequentially from one having the highest priority out of the parts registered in the parts storage 3 according to the priority for each part dynamically set by the dynamic priority setting unit 1102. Then, the parts selecting unit continues to select the part so that the total of data amount of all the selected parts becomes the maximum with keeping the total less than the total transmittable amount of map data determined by the data amount determining unit.

Further, every time when the data amount determining unit 13 updates the total transmittable amount of map data according to the change of the traffic status of the network or the moving speed of the mobile terminal, the parts selecting unit selects the parts again out of the parts which have not been transmitted.

In this way, the parts to be transmitted is selected, and the transmitting unit 15 sequentially transmits the selected parts according to the priority set for each part.

By utilizing the map transmitting apparatus of the present embodiment, it becomes possible to distribute the most readable deformed map for each guiding route in response to changes of the traffic status, the moving speed of the mobile terminal, the communication speed of the communication media, and so on.

Figure 11:
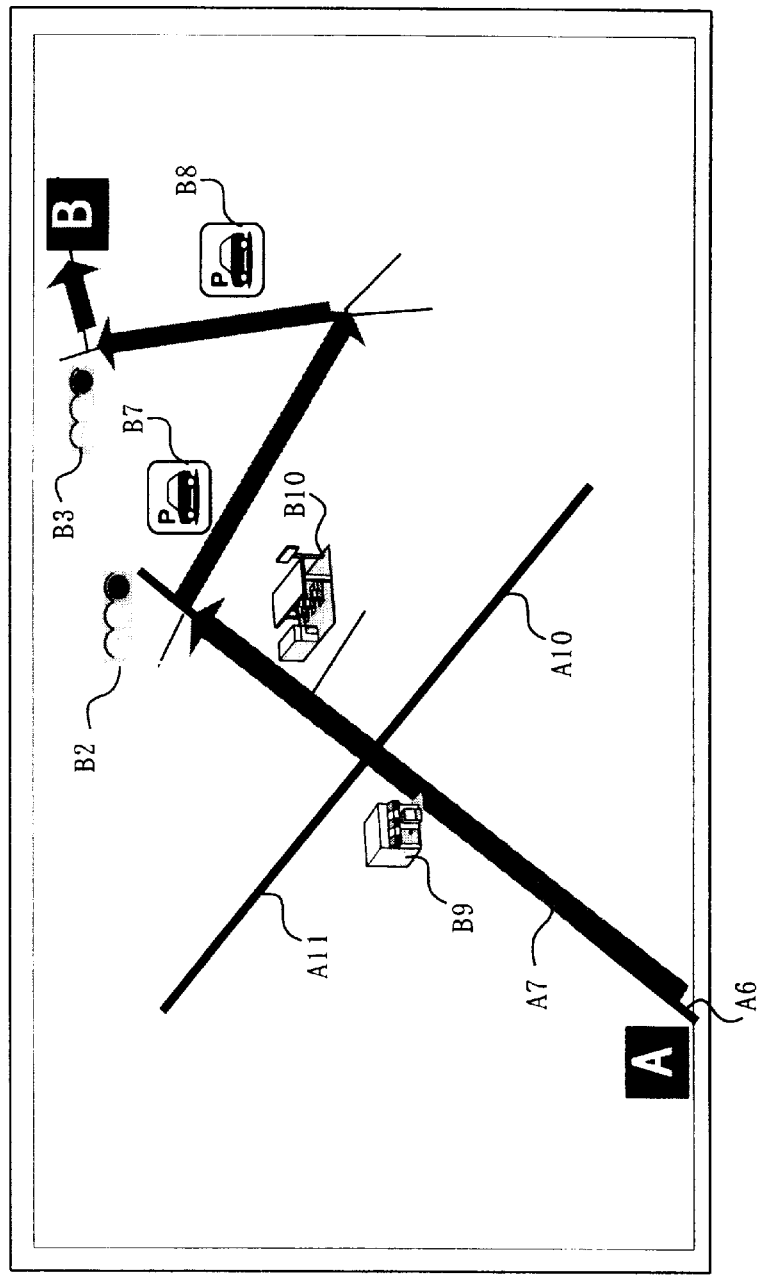
FIG. 11 shows an image drawing of the map data displayed on the screen of the mobile terminal.

For example, in case of transmitting the map data shown in FIG. 10 when a sudden increase of the communication traffic occurs, the total transmittable amount of map data has to be drastically decreased. Even if such a case occurs, the apparatus can transmit the map data including the guiding route and the minimum information of the facilities to keep the guiding route readable as shown in FIG. 11, which enables the user to recognize the guiding route to follow without information of other facilities being displayed.

In the above embodiment, the transmission of map data has been explained, however, the application of the embodiment is not limited to the transmission of map data, but to the transmission of other kind of data.

Embodiment 2

In the following, another embodiment will be explained, in which a priority setting table based on distance from guiding route or a priority setting table based on distance from present location is used as the priority setting table.

Figure 15:
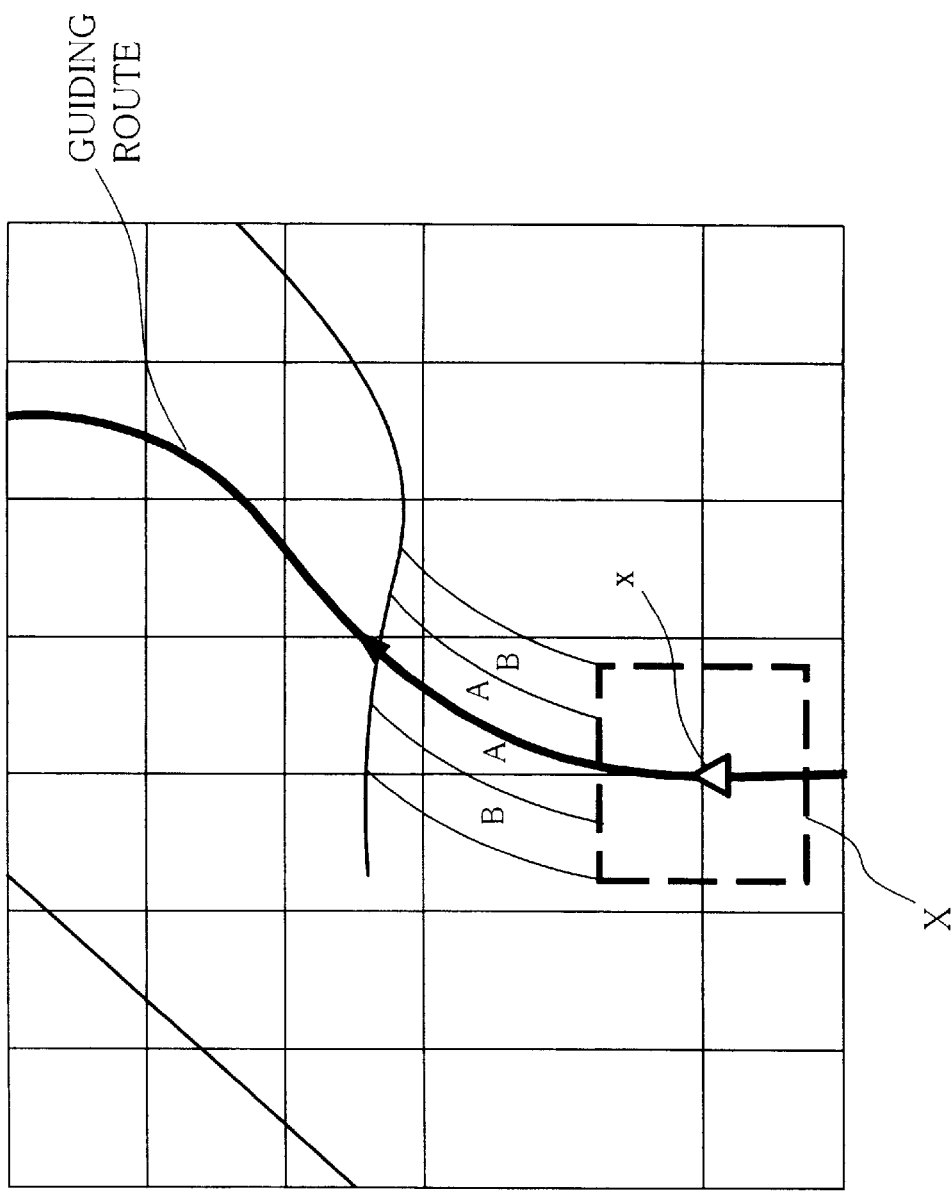
FIG. 15 shows a concrete example of setting a priority based on the distance from the guiding route.

Each of the above priority setting tables is a table for setting a priority based on the real-timeliness required for each part, while the priority setting table based on readability of route (FIG. 3) shows a priority setting standard for generating the most readable deformed map in the first embodiment. Here, the priority setting table based on distance from guiding route is a table for setting a higher priority to a nearer part such as a road or facilities from the guiding route, for example, as shown in FIG. 5. Concretely, a straight line is drawn from the center of gravity of the part toward the route so as to cross the route with a rectangular and the distance between the crossing point of the straight line and the center of gravity of the part is obtained. If the straight line crosses the route plural times, the shortest distance from the plural crossing points to the center of gravity is defined as the distance of the part from the route. The priority is set based on the distance of the part from the route, and the shorter the distance becomes, the higher the priority is set to the part. Namely, in an example shown in FIG. 15, a higher priority is set to a part included in an area A, and a lower priority is set for a part included in an area B. FIG. 15 shows map data around the present location of the user, in which a pointer x shows the user and a range X is a display scope showing the map to be displayed on the screen of the mobile terminal of the user. On setting the priority using the priority table based on distance from guiding route, a higher priority is set to the part included in the area A which locates closer to the guiding route.

On the other hand, the priority table based on distance from present location is a table setting a higher priority to the part such as a road or facilities which locate closer to the present location of the mobile terminal. Concretely, a priority is set to each part according to a distance from the center of gravity of the part to the location of the user (mobile terminal). The shorter the distance becomes, the higher the priority is set to the part. The configuration of the priority setting table based on distance from present location is the same as the priority setting table shown in FIG. 5.

The priority setting table based on distance from present location is effective, for example, in case that the mobile terminal stores only small road information concerning the guiding road, namely, the road information is going to disappear in a few minutes. In such a case, if the data except the road of the guiding route is transmitted first according to the static priority, the road information concerning the guiding route disappears in a few minutes, which causes the user in trouble to recognize how to follow the guiding route. Namely, such a situation brings a big problem on the map providing service. However, according to the present embodiment, transmission of the parts closer to the guiding route or the present location has a priority, and therefore, it is possible for the user to recognize at least the route to follow even if he does not know the circumstance. Consequently, the map transmitting apparatus can effectively prevent the problem on the route guiding service.

Embodiment 3

In the foregoing first and second embodiments, the priority is set according to a single priority setting table. However, it is possible for the dynamic priority setting unit 1102 to set a priority according to combined plural priority setting tables, which will be explained in the following.

Considering the performance of the mobile terminal registered in the user information database unit, the dynamic priority setting unit 1102 sets the priority according to, for example, the priority setting table based on readability of route (FIG. 3) and the priority setting table based on distance from guiding route (FIG. 5) combined. Namely, the dynamic priority setting unit sets the priority more precisely by adding the priority for each part set by the priority setting table based on distance from guiding route to the priority set by the priority setting table based on readability of route.

For example, a part belonging to the group (3), which is a road near the route but does not cross the route, is assigned the priority 28 according to the priority setting table based on readability of route. Further, if this road is a little far from the route, for example, within a range of 50 m–100 m from the route, the priority 3 is assigned according to the priority setting table based on distance from guiding route. Adding both priorities results in the priority 31. For another example, a part belonging to the group (4), a traffic light on the route, is assigned the priority 27 according to the priority setting table based on readability of route, and further, since the part is on the route, the priority 5 is assigned according to the priority setting table based on distance from guiding route. Consequently, the priority 32 is set to the part of the traffic light.

In this way, since the priority is set to each part by adding the priorities set by both priority setting tables, a priority having different value from one set using only the priority setting table based on readability of route is assigned to each part. Accordingly, the embodiment enables to set the priority more suitable to the guiding route.

In another way, the priority can be set according to the priority setting table based on readability of route (FIG. 3) and the priority setting table based on distance from present location (FIG. 6) combined. As well as the above example, a new priority is set by adding the priority set by the priority setting table based on readability of route and the priority set by the priority setting table based on distance from present location.

Further, a more complex case can be considered in which the priority is set by adding a weight corresponding to the user's request to the priority set using each priority setting table.

Then, after the dynamic priority setting unit 1102 sets the priority in the above procedure, the data amount determining unit 13 determines the total transmittable amount of map data as well as the first embodiment. Further, the parts selecting unit 14 selects the parts according to the newly set priority, and the transmitting unit 15 transmits the selected parts according to the priority.

As described above, since the dynamic priority setting unit sets the new priority by combining plural priority setting tables, the priority can be set more precisely. The parts can be separated into the parts which are required to be transmitted in a haste and the parts which are not required to be transmitted in a haste, and then the parts are transmitted according to the assigned priority. Therefore, a high real-timeliness can be obtained by separating the parts in this way, with securing the readability of the route.

In the third embodiment, an explanation has been made in case of transmitting the map data, however, the present embodiment can be applied to transmitting not only the map data but also other kind of data.

Embodiment 4

In the fourth embodiment, another case will be explained in which map data around the user's moving direction has a priority to be transmitted when the user drives or moves without setting the guiding route.

In this case, since the route is not set, a higher priority cannot be set to the parts closer to the guiding route, however, it is effective to set a higher priority to the parts which are included in the map data in the user's moving direction.

Figure 16:
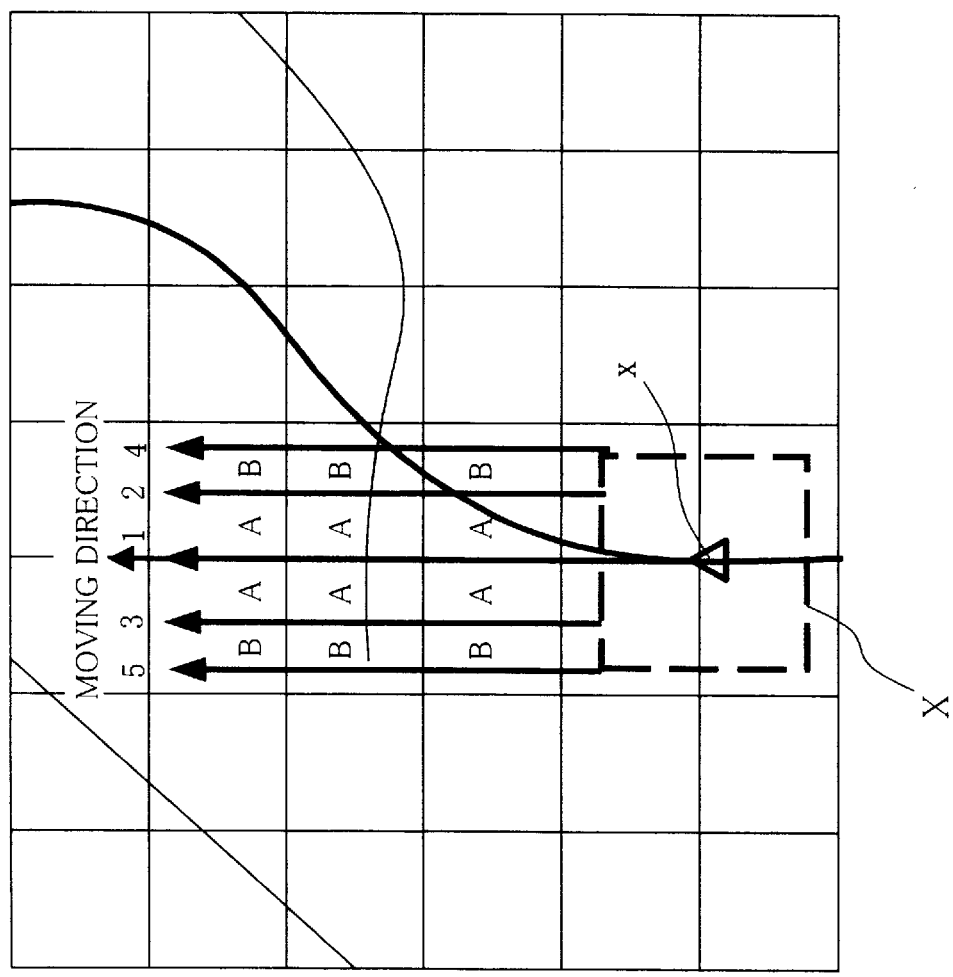
FIG. 16 shows setting a priority based on the moving direction of the user.

The following describes setting a priority of map data based on the user's moving direction referring to FIG. 16. FIG. 16 shows map data around the present location of the user. In the figure, the pointer x shows the present location of the user, and a range X is a display scope showing a map displayed on the display screen of the mobile terminal used by the user.

A vector 1 is drawn from the pointer x in the moving direction, and an arbitrary number of vectors are provided at both sides of the vector 1. In FIG. 16, vectors 2–5 are provided. The highest priority is set to the parts included in an area A located between the vector 1 and the vector 2, and in another area A located between the vector 1 and the vector 3. A next priority is set to the parts included in an area B located between the vectors 2 and 4, and another B area located between the vectors 3 and 5. The priority setting table based on distance in moving direction can be considered to have a similar configuration to FIG. 5. A priority is set based on the distance from the vector 1, such as 0 m–10 m, 10 m–50 m from the vector 1.

However, in this case, since it is not guaranteed that the user continues to move in the same direction, the distribution of the map data is limited to the area around the present location of the user. Concretely, the parts are transmitted according to the priority setting table based on distance from present location in addition to the priority setting table of the present embodiment. In this way, the distribution of the parts included in the unnecessary area for the user can be prevented as much as possible.

Then, after the dynamic priority setting unit 1102 sets the priority in the above procedure, the data amount determining unit 13 determines the total transmittable amount of map data as well as the first embodiment. Further, the parts selecting unit 14 selects the parts according to the newly assigned priority, and the transmitting unit 15 transmits the parts based on the priority.

Further, even if the user does not set the route, the road where the user is now moving can be assumed as a temporary route, and a higher priority can be set to the parts included in the area around the direction of the route.

Concretely, this can be implemented by applying the priority setting table based on distance from guiding route which has been explained in the second embodiment. Namely, the road where the user is now moving is assumed as the guiding route shown in FIG. 15, and a higher priority is set to the parts included in the area A which is located closer to the present assumed route than the parts included in the area B. The priority setting table based on distance from present assumed route can be considered to have a similar configuration to FIG. 5. The priority is set based on the distance from the present assumed route, such as 0 m–5 m, 5 m–10 m.

Also in this case, the user might leave the present assumed route and move to another road. Even in such a case, unnecessary distribution of data can be prevented as much as possible by applying a rule that a higher priority should be set to the parts closer to the user,.

Then, after the dynamic priority setting unit 1102 sets the priority in the above procedure, the data amount determining unit 13 determines the total transmittable amount of map data as well as the first embodiment. Further, the parts selecting unit 14 selects the parts according to the newly set priority, and the transmitting unit 15 transmits the selected parts according to the priority.

Embodiment 5

Next, a map distribution method in order to display a specified map by scrolling (moving operation of the map data displayed on the screen) on the mobile terminal will be explained.

On specifying the area of the map displayed by scrolling, the map data in the scrolling direction should have a priority for distribution.

Therefore, the present embodiment will explain a method for setting a higher priority to the map data in the scrolling direction.

First, when the user tries to scroll the display, the user should specify a direction to scroll the display using a scrolling indicator (not shown in the figure) provided to the mobile terminal of the user. The mobile terminal requests the map data transmitting apparatus to transmit the map data along the scrolling direction indicated by the scrolling indicator, and the map data transmitting apparatus receives a scrolling request at a request detector 7. Then, the dynamic priority setting unit 1102 sets a higher priority to the map data in the scrolling direction according to the scrolling request.

Figure 17:
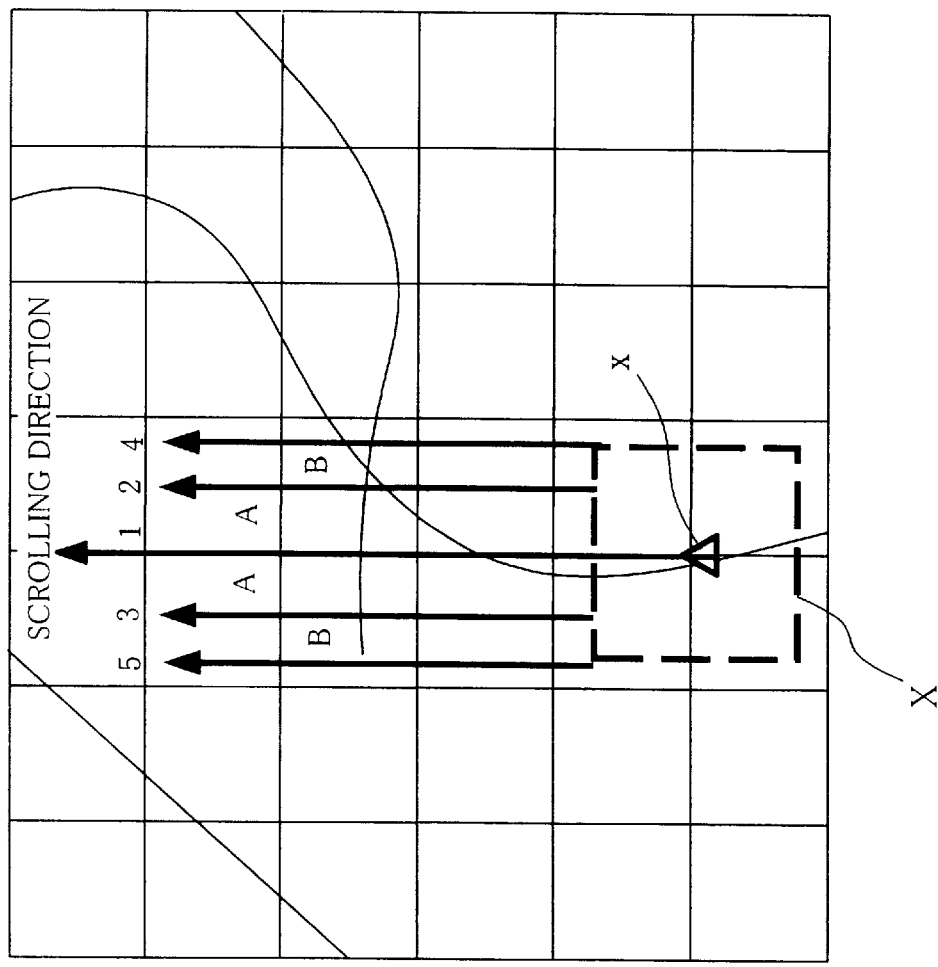
FIG. 17 shows setting a priority based on the scrolling direction.

The following will explain setting a priority by the dynamic priority setting unit based on the scrolling direction referring to FIG. 17. FIG. 17 shows map data around the present location of the user. In the figure, the pointer x shows the present location of the user, and the range X is the display scope showing a map displayed on the display screen of the mobile terminal used by the user.

It is assumed that the user requests to scroll the map in the direction of the vector 1 using the scrolling indicator. Namely, the map is to be scrolled in the direction shown by the vector 1, which means the vector 1 becomes the scrolling direction. On the other hand, in the present embodiment, the vectors 2–5 are provided with a predetermined interval from the vector 1 that is the scrolling direction.

In the embodiment, a higher priority is set to the part included in an area closer to the scrolling direction. Therefore, the highest priority is set to the part for the map data included in an area A located between the vectors 1 and 2 (A①–A③) and another area A located between the vectors 1 and 3 (A①–A③). Subsequently, a lower priority is set to the part for the map data included in both areas next to the areas A, that is, an area B located between the vectors 1 and 3 and another area B located between the vectors 3 and 5. In this way, the farther the part is located from the scrolling direction, the lower the priority assigned to the part becomes. The priority setting table has the similar configuration as FIG. 5, in which the priority is set based on the distance from the vector 1, such as 0 m–10 m, 10 m–50 m.

On the other hand, when the priority is set only based on the scrolling direction, a high priority is set to the part which is close to the scrolling direction even if the part is far from the present location of the user. Namely, in FIG. 17, a higher priority is set to the part included in the area A even if the part is far from the present location of the user than the part included in the area B. Accordingly, for example, a higher priority is set to the part located at A④ or A⑤, which is far from the user, than the part located at B①, which is not practical to provide an effective map data. Therefore, the method for setting the priority based on scrolling direction according to the present embodiment is incorporated to another method for setting the priority, for example, the method for setting the priority using the priority setting table based on distance from present location, so as to obtain an effective priority setting.

In this way, since a higher priority is set to the part which is closer to the scrolling direction, it can be omitted to set the priority to the parts which have no relation with the scrolling direction (the parts located in the right, left, or down direction in FIG. 17). The priority is set only to the part included in the scrolling direction, which is required for transmission of map data, by using another kind of priority setting table. Therefore, the processing speed of setting the priority by the dynamic priority setting unit 1102 can be increased.

After the dynamic priority setting unit 1102 sets the priority in the above procedure, the data amount determining unit 13 determines the total transmittable amount of map data as well as the first embodiment. Further, the parts selecting unit 14 selects the parts according to the newly set priority, and the transmitting unit 15 transmits the selected parts according to the priority.

When the scrolling direction is changed, a vector is newly set according to the new scrolling direction, and the priority should be adjusted. The priority is reset so as to set a higher priority to the parts included in the new scrolling direction.

With reference to FIGS. 18A and 18B, the distribution procedure of the parts in case that the scrolling direction is changed will be explained in the following.

Distribution lists A and B respectively shown in FIGS. 18A and 18B specify the transmitting sequence according to the priority of the part. The distribution list B shows the transmitting sequence after the scrolling direction is changed, while the distribution list A shows the transmitting sequence before the scrolling direction is changed. The parts are distributed according to the distribution list A before the scrolling direction is changed. For example, the part 5 is now processing to be distributed. It is assumed that during this process of distributing the part 5, the scrolling direction is changed. The priority for each part is reset as shown in the distribution list B as a result of adjusting the priority. The server interrupts the distribution process of the part 5 immediately, and a new distribution process is started according to the distribution list B. Namely, the distribution process of the part 11 is started.

In this way, according to the fifth embodiment, the priority is set based on the scrolling direction, and when the scrolling direction is changed, the priority is reset based on the new scrolling direction. Further, when the scrolling direction is changed, the distribution is started according to the new priority. Consequently, the distribution of the map data, which the user wishes to display on the screen by scrolling, is prioritized, so that the map distribution service flexibly matched with the scrolling operation of the user can be implemented.

Embodiment 6

In the sixth embodiment, another case will be explained in which the dynamic priority setting unit 1102 sets the priority, reflecting the request dynamically issued by the user.

In an actual case of guiding the route, while the user is moving along the guiding route, the user may request the server to provide the information of certain facilities such as a gas station, a parking lot, a restaurant, a convenience store, etc. along the guiding route or around the guiding route. For example, it is assumed that the user requests the server to immediately transmit the information of the gas station. In such a case, if the distribution of the map data is performed using the static priority setting table shown in FIG. 2 or the priority setting table based on readability of route shown in FIG. 3, since the priority for the gas station is not high, the parts of the gas station are transmitted late. Therefore, the user only receives only the information of the gas station that the user has already passed, which means useless and unnecessary information has been transmitted.

In the present embodiment, the dynamic priority setting unit 1102 sets the highest priority to the gas station which the user requests by combining the static priority setting table shown in FIG. 2 or the priority setting table shown in FIG. 3 with the user's request. In the following, a concrete procedure of setting the priority in response to the user's request will be explained.

First, the request detecting unit 7 receives the request to provide the information of certain facilities such as a gas station, a parking lot, a restaurant, a convenience store, etc. which is dynamically generated by the user from the mobile terminal while the user moves along the guiding route.

Secondary, a route searching unit 12 searches the facilities (point), for example, a gas station requested by the user within a predetermined range of area. The route searching unit 12 further searches the route to the point and the route back from the point to the original guiding route.

Then, the dynamic priority setting unit 1102 sets the priority to parts of plural gas stations searched by the route searching unit 12. In the present embodiment, the dynamic priority setting unit 1102 sets the priority based on the reachability. Namely, the dynamic priority setting unit sets a higher priority to the parts having a higher reachability.

Here, the reachability indicates easiness to reach each of the facilities when plural facilities have been searched. For example, when the user requests the information of the gas station, the gas station which locates at the easiest place for the user to go has the highest reachability among the plural gas stations around the present location of the user.

The reachability is judged based on the following standard:

1) a distance to run between the guiding route and the facilities;
2) a static priority of the route between the guiding route and the facilities; and
3) statistical traffic information of the route between the guiding route and the facilities.

Accordingly, a higher priority is set to the parts for the facilities having a higher reachability by the dynamic priority setting unit 1102. Namely, a higher priority is set to the parts for the facilities having a shorter distance to run, a higher priority is set to the parts for the facilities having the route to go and come back with a higher static priority, and further, a higher priority is set to the part for the facilities having the route to go and go back with a less traffic of the statistical traffic information.

Here, the distance to run means a distance obtained by subtracting the moving distance the user might go along the original guiding route from the distance the user should go to the point and come back to the original guiding route. If the user comes back along the original route because he has dropped at the point, the distance he comes back should be added to the distance to run. A concrete explanation of a concept of the distance to run will be made in the following with reference to FIG. 7.

Figure 7:
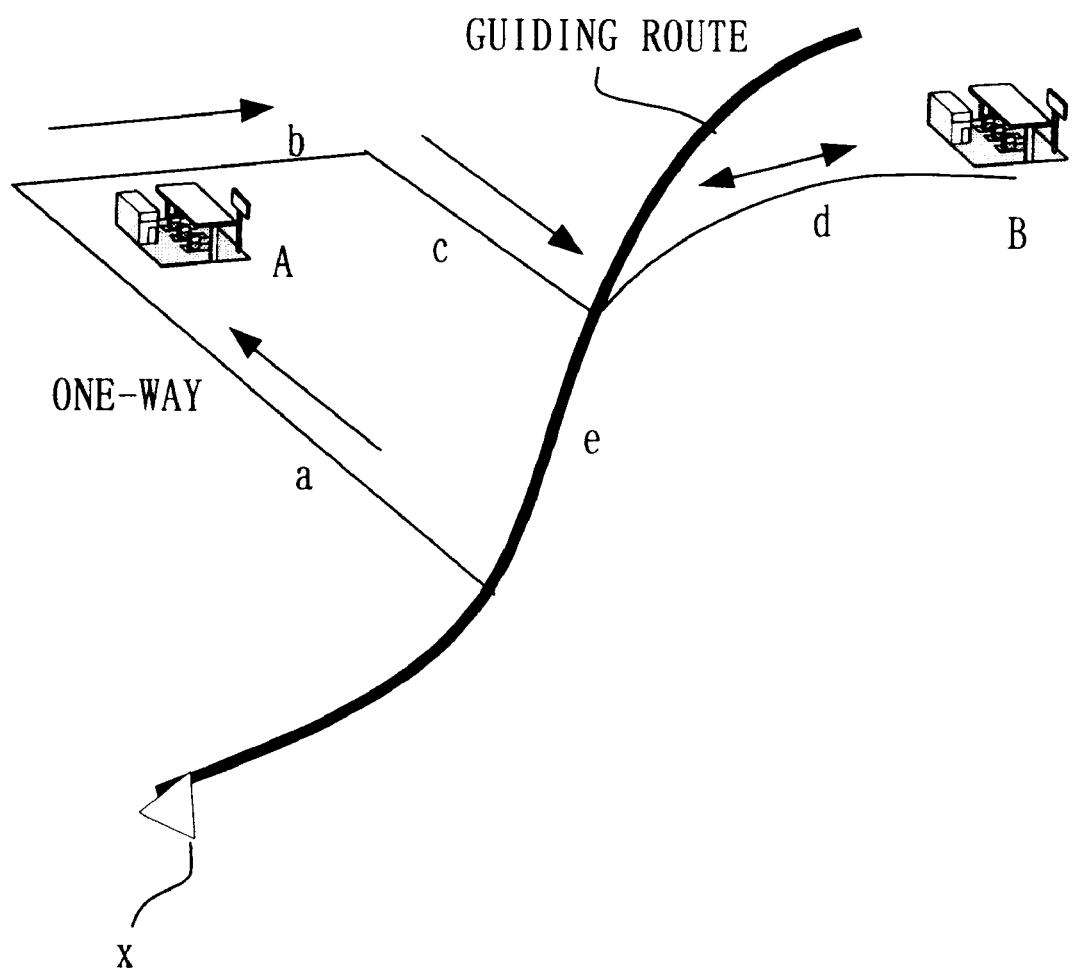
FIG. 7 shows a distance to run.

Points A and B shown in FIG. 7 are the parts for the facilities requested by the user, namely, the gas station. The present location of the user is indicated by the pointer x, and a, b, c, d, e are the parts showing roads. The road parts a, b and c show the route to go to the gas station A and to come back to the original guiding route. The road part d shows the route to go to the gas station B. The road part e is a part of the guiding route which is presently used. It is assumed that the static priorities for the road parts a, b, c, and d are the same, and a sum of length of the parts a, b, and c is L1, a length of the part e is L2, and a length of the part d is L3. When L1−L2>2 *L3, it can be said the route to go to and come back from the gas station B has a shorter distance to run than the route to go to and come back from the gas station A, which means the gas station B has a higher reachability than the gas station A.

In the following, the reachability based on the statistical traffic information will be explained. When the traffic is very smooth, a coefficient is set to 1. The number less than 1 is added to the coefficient according to how much the traffic is crowded (namely, the coefficient becomes 1.2 or 1.4 according to increasing the traffic). A statistical average driving speed is calculated by multiplying the above coefficient to a driving speed (for example, a statutory speed limit of the route to the facilities). A time required for dropping at the point can be calculated based on the statistical average driving speed and the distance to run of the route (the distance to run from the guiding route to the facilities and from the facilities to the guiding route). A lower priority is set to the facilities which requires a longer time to go.

The reachability based on the static priority of the route to the facilities will be explained in the following. When the plural facilities are searched, the lowest static priorities assigned to the parts for roads, which respectively constitute the routes to the facilities, are compared. The route to the facilities including the part to which the highest of the lowest static priority is assigned among the above parts is judged to have the highest reachability.

Next, procedures of searching the facilities according to the reachability and dynamically setting the priority to the searched facilities will be described. For example, when the point required by the user is searched according to the reachability based on the distance to run, the route searching unit 12 searches all the gas stations located, for example, within 5 km of the distance to run and the corresponding routes (the route from the guiding route to the facilities and from the facilities to the guiding route). The parts selecting unit 14 extracts the figure parts showing all the searched gas stations and the corresponding routes, and the dynamic priority setting unit 1102 dynamically sets the priority based on the distance to run. For example, the priority setting table shown in FIG. 8 is provided and the priorities for the figure parts are set according to the items listed in the table.

In FIG. 8, the standard for setting the priority listed below (5) a gas station located within the range of equal to or more than 3 km and equal to or less than 5 km from the present location, and (6) a route to the gas station located within the range of equal to or more than 3 km and equal to or less than 5 km from the present location are the same configuration with the priority setting table based on readability of route such as (7) a road constituting the route. However, it is possible to change the standard for setting the priority of the part specified below (6) so as to set a higher priority to the part which is closer to the gas station specified by (1), (3) and (5) according to the sequence of the distance. Namely, it is possible to set a higher priority to the figure part which is located closer to each of the plural gas stations requested by the user.

Further, for example, the user may request to transmit a real-time road traffic information or POI information such as traffic jam information, construction information, accident information, lane restriction information, vacancies of the parking lot. In such a case, the dynamic priority setting unit 1102 sets the priority to the real-time road traffic information or POI information such as traffic jam information, construction information, accident information, lane restriction information, vacancies of the parking lot in addition to the part constituting the map data. Further, the parts selecting unit 14 selects the real-time road traffic information or POI information such as traffic jam information, construction information, accident information, lane restriction information, vacancies of the parking lot in addition to the parts constituting the map data, so that the total amount of which becomes the maximum and also less than the total transmittable amount of map data determined by the data amount determining unit.

The procedure afterwards is the same as the first embodiment. The transmitting sequence is determined according to the priority set by the dynamic priority setting unit 1102, and the transmitting unit 15 transmits the parts according to the above transmitting sequence.

In this case, the transmitting unit 15 transmits the parts showing all the gas stations within 5 km from the present location of the user sequentially from the part standing for the closest gas station to the user (the gas station having the shortest distance to run), and the screen displays the map information of all the gas stations within 5 km from the present location of the user sequentially from the gas station which is the closest to the user (the gas station having the shortest distance to run).

In the above explanation, the priority has been determined according to the reachability based on the distance to run, however, the priority can be determined, further, according to the reachability based on the statistical traffic information and the static priority of the route, or based on the combination of the above three standards, namely, the distance to run, the statistical traffic information and the static priority of the route.

Further, another method can be applied, where the route searching unit 12 selects an arbitrary number of certain facilities having high reachability on searching the facilities.

The route searching unit 12 searches, for example, only three gas stations which do not have long distances to run from the present location of the user in sequence of the distance. Then, the parts selecting unit 14 extracts the figure parts showing the three gas stations and the figure parts showing the corresponding routes (the route from the guiding route to the gas station and from the gas station to the guiding route), and the dynamic priority setting unit 1102 can set the highest priorities to the selected three gas stations and the corresponding routes.

Further, different from the above cases where the user requests vague information, the user sometimes requests a concrete guiding route. Namely, the user does not request a route information to the gas station located close to the user as explained in the above case, but the user concretely indicates 'gas station A' and requests a route information to the gas station A.

In such a case, the route searching unit 12 searches the route to the gas station A, and the parts selecting unit 14 extracts the figure part showing the gas station A and the figure parts constituting the corresponding route (the route from the guiding route to the gas station A and from the gas station A to the guiding route). Then, the dynamic priority setting unit 1102 sets the highest priority to the gas station A and the corresponding route.

In the above case, the dynamic priority setting unit 1102 also sets a higher priority, except the gas station A and the corresponding route, to the part which is closer to the gas station A. Namely, it is possible to set a higher priority to the figure part which locates closer to the gas station A indicated by the user.

Further, in the above explanation, the priority has been determined according to the reachability based on the distance to run, however, the priority can be set according to the reachability based on the statistical traffic information and the static priority of the route, or based on the combination of the three standards, that is, the distance to run, the statistical traffic information and the static priority of the route.

As has been described, in the present embodiment, it is possible to set a higher priority to the part relating the user's request. Accordingly, the user can request the map data transmitting apparatus to provide information of a necessary facilities so that the map information to the facilities and the corresponding route or the relating information to the route provided by the map data transmitting apparatus can be added on the display screen even after the user sets the route and obtains the guiding map information.

By having such a configuration, the transmission of the information required by the user can be prioritized, which eliminates an unnecessary transmission of the map data caused by delay.

In the sixth embodiment, the explanation has been done concerning the transmission of map data, however, an application of the embodiment is not limited to the transmission of map data, but also to the transmission of other kinds of data.

Embodiment 7

In the first through fourth embodiments, the priority is set dynamically in response to the user's various kinds of requests such as setting the guiding route, providing the traffic information.

In the seventh embodiment, another case of dynamically setting the priority will be explained, in which the priority is set with varying the priority setting table based on the detected results of the traffic status detector, the moving speed detector and the communication media detector without a specific request for setting the route from the user.

For example, the traffic status detector 8 detects a sudden increase of the network traffic. In this case, it takes long for the transmitted part to reach the mobile terminal, and further, the data might be discarded at the relay station. Therefore, in such a case, the map data transmitting apparatus should limit and transmit the part to be reached the mobile terminal rapidly and safely.

Accordingly, when the traffic status detector 8 detects the sudden increase of the traffic, the dynamic priority setting unit 1102 should set the priority more strictly. For example, the simple priority setting table based on readability of route shown in FIG. 3 is switched with the stricter priority setting table, and the strict priority setting is performed.

It is assumed that the moving speed detector 9 detects a sudden increase of the moving speed so that the moving speed should exceed the predetermined threshold value, namely, the speed of the data transmission cannot catch up with the speed of updating the display. Then, the data amount determining unit decreases the amount of transmittable map data so that at least the data for minimum parts for guiding route should reach the mobile terminal. That is, in such a case, the part to reach the mobile terminal should be strictly selected and transmitted.

Accordingly, when the moving speed detector 9 detects the sudden increase of the moving speed, the dynamic priority setting unit 1102 needs to set the priority more strictly. For example, the dynamic priority setting unit 1102 sets a stricter priority using the priority setting table shown in FIG. 6, having a more restrictive standard for setting priority, switched from the priority setting table based on readability of route shown in FIG. 3, having a simple priority setting standard.

Similarly, when the communication media detector 10 detects a fact that the communication media of the mobile terminal has been switched to the one having slower communication speed, it takes long for the transmitted part to reach the mobile terminal. Because of this, the part to reach the mobile terminal first (the part to be transmitted first) should be strictly selected and transmitted.

Accordingly, when the fact that the communication media has been switched to the one having slower communication speed, the dynamic priority setting unit 1102 needs to set the priority more strictly. For example, the dynamic priority setting unit 1102 sets a stricter priority using the priority setting table shown in FIG. 6, having a more restrictive standard for setting priority, switched from the priority setting table based on readability of route shown in FIG. 3, having a simple priority setting standard.

In the seventh embodiment, the explanation has been done concerning the transmission of map data, however, an application of the embodiment is not limited to the transmission of map data, but also to the transmission of other kinds of data.

Embodiment 8

Figure 12:
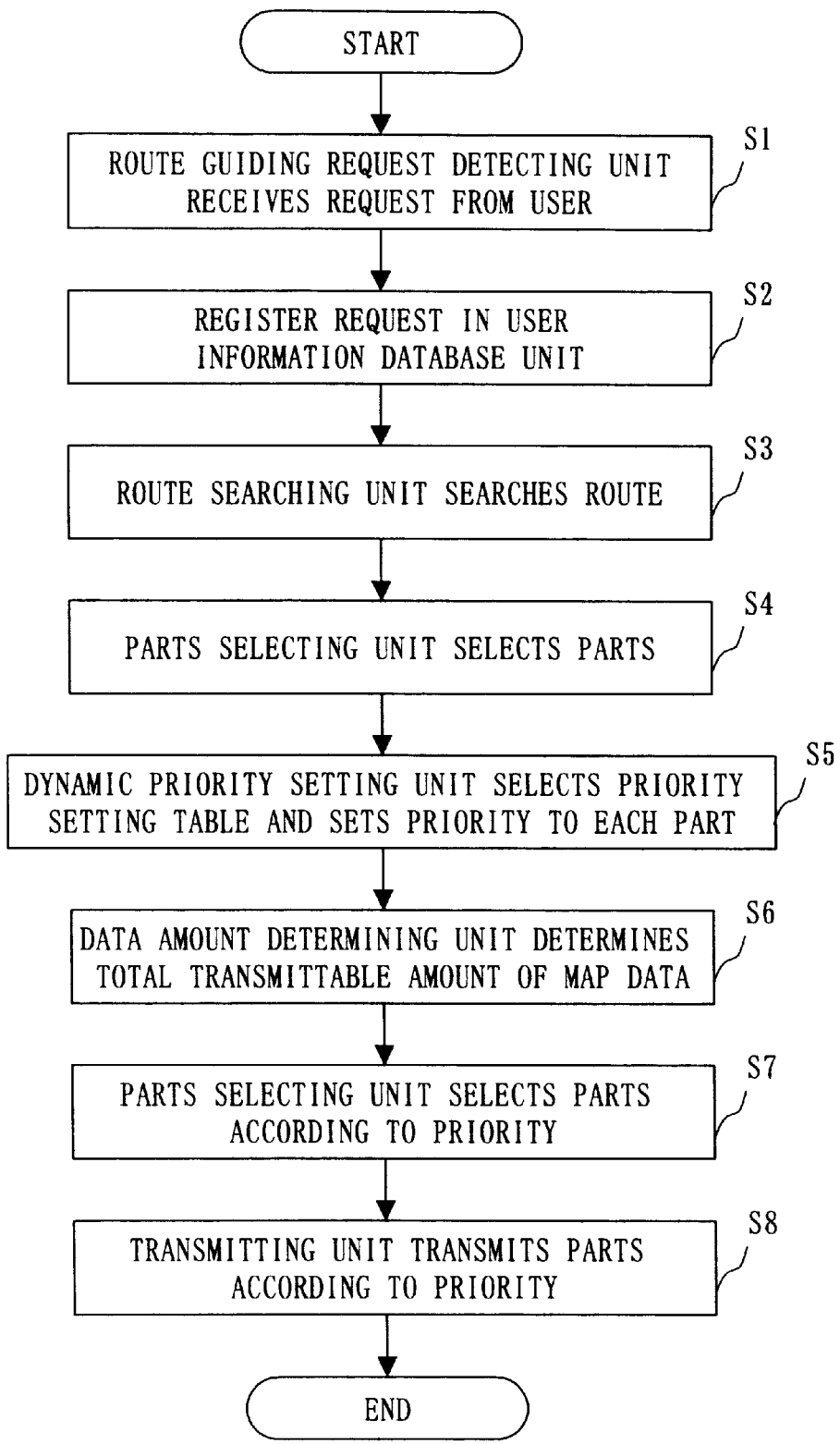
FIG. 12 is a flowchart showing a transmitting method of map data in relation to the present invention.
Figure 13:
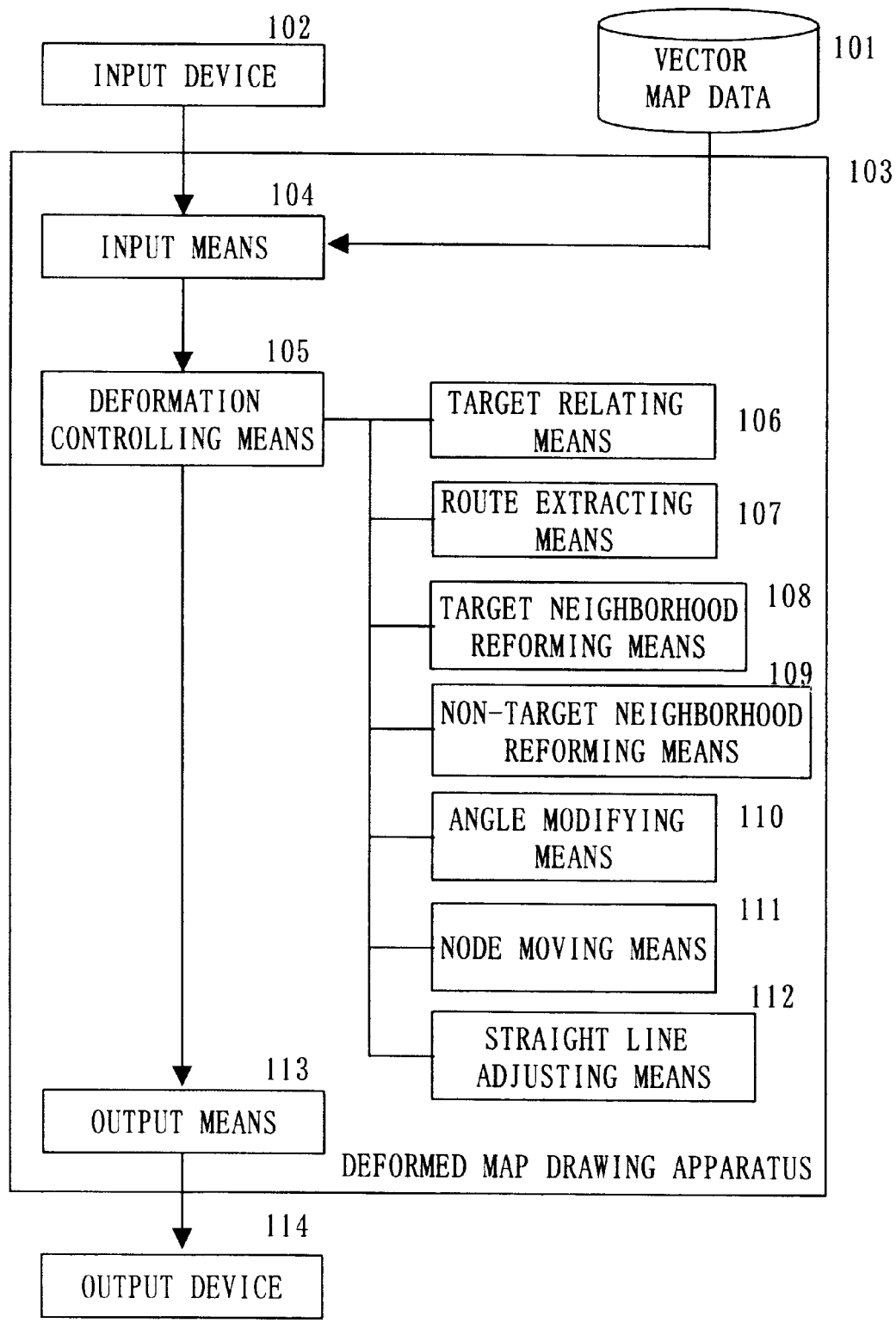
FIG. 13 shows a functional block diagram of a deformed map forming apparatus according to a related art.
Figure 14:
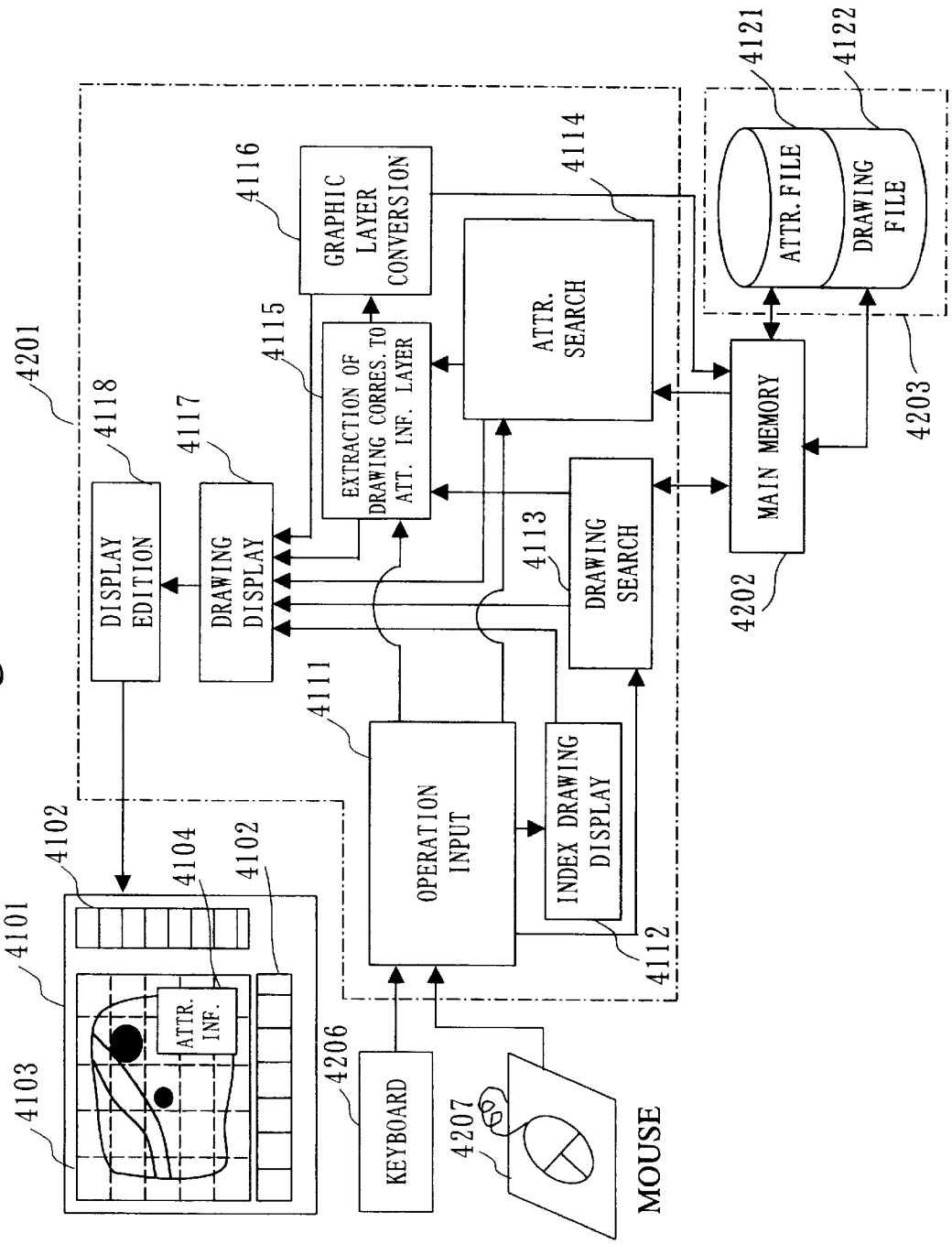
FIG. 14 shows a functional block diagram of a graphic data managing apparatus according to a related art.

In the eighth embodiment, a method for transmitting the map data will be explained in reference to FIG. 12. The basic operation is the same as the map data transmitting apparatus which has been described in the first embodiment.

Although a flowchart of FIG. 12 does not show a step for storing map data, as a premise of the operation, there is a step for storing map data which stores the map data in form of the figure part (hereinafter, called as "part") constituting the map data.

First, at step S1, the request detecting unit receives the request for guiding route from the user. The request for guiding route includes the request for searching the route between the present location of the user (mobile terminal) and the destination and the request for map distribution which is necessary for guiding route. At this time, the request detecting unit also receives various requesting conditions such as the communication media used by the user (mobile terminal), the map requested from the mobile terminal (a relay point, a means for transportation to take, roads, etc.), POI (Point Of Interest) information, the memory capacity of the mobile terminal for registering and storing the received data, the moving speed of the mobile terminal. Then, at step S2, the request detecting unit registers these received information in the user information database unit.

Next, at step S3, the route searching unit searches the route in response to the request for guiding route from the mobile terminal. After searching the route has been finished by the route searching unit, at step S4, the parts selecting unit extracts the parts constituting the map information of the guiding route and the map information related to the guiding route (a traffic light, facilities, name data, roads crossing the route, etc.) out of the parts stored in the parts storage of the map database unit.

Then, at step S5, the dynamic priority setting unit selects an optimal table out of plural priority setting tables based on the communication media to be used, the memory capacity of the mobile terminal, and the moving speed of the mobile terminal, and sets the priority to each part according to the selected priority setting table.

Next, at step S6, the data amount determining unit determines a maximum transmittable amount of map data within the unit time (a total transmittable amount of map data). The data amount determining unit calculates the transmittable amount of map data with considering the performance of the mobile terminal of the receiver (the memory size for storing the map information, CPU performance, display screen size and so on), the moving speed of the mobile terminal, and the communicating performance of the communication media used for transmitting data such as the speed and the communication band. Further, after calculating the transmittable amount of map data, the data amount determining unit updates the transmittable amount of map data by increasing/decreasing the value of the amount at each time when the traffic status of the network, the moving speed of the mobile terminal, and the communication media used by the mobile terminal vary.

Then, at step S7, the parts selecting unit selects the parts to be transmitted according to the priority assigned to each part, namely, sequentially from the part having the highest priority. The parts selecting unit selects the parts so that the data amount of all the selected parts becomes the maximum value and also less than the transmittable amount of map data determined by the data amount determining unit.

Finally, at step S8, the transmitting unit transmits the parts selected by the parts selecting unit according to the priority.

In the eighth embodiment, the explanation has been done concerning the transmission of map data, however, an application of the embodiment is not limited to the transmission of map data, but also to the transmission of other kinds of data.

As has been described, the data transmitting apparatus; the map data transmitting apparatus, the method for transmitting map data, and a recording medium storing a program of the method for transmitting map data have the following features.

According to the present invention, the data transmitting apparatus, the map data transmitting apparatus, the method for transmitting map data, and a recording medium storing a program of the method for transmitting map data comprise:

a map database unit for storing the part constituting a vector-formatted map including a bit-map format, a map generated by two dimensional or three dimensional CG, a map generated by CAD, which are classified into plural groups respectively having priorities set for guiding the route;

a priority setting unit for extracting the part relating the route or the part improving the route readability out of the parts registered in the map database unit, and dynamically resetting the priority to each part, to which the priority has been reset according to the ratio of route readability and the necessity of display, and further the predetermined static priority of the group at each time of setting the guiding route or resetting the guiding route;

a data amount determining unit for calculating and determining the transmittable amount of map data based on the performance of the mobile terminal of the receiver (the memory size for storing the map information, the CPU performance, the size of display screen and so on), the moving speed of the mobile terminal, the communicating performance of the communication media used for the transmission of data such as communicating speed, the communication band and so on, and for dynamically updating the transmittable amount of map data by increasing/decreasing the transmittable amount of map data, which has been once determined, according to the traffic status of the network web at each time when the change of the traffic status of the network is detected; and a parts selecting unit for selecting the part constituting the map to be transmitted according to the priority assigned to the part.

Further, the priority setting unit is characterized in setting a higher priority to the part located closer to the guiding route, the part located closer to the present location of the user, or the part which the transmitting apparatus wishes to transmit sooner.

Yet further, the priority setting unit is characterized in setting a higher priority to the part which the transmitting apparatus wishes to transmit more safely without dropping any piece of data.

The parts selecting unit is characterized in extracting the facilities located along the guiding route to the destination and within a predetermined distance from the guiding route, or the facilities having a distance to run within a predetermined value, in response to the request to provide the information of facilities such as a gas station, a parking lot, a restaurant, a convenience store dynamically issued by the user while the user moves along the guiding route, and selecting the parts showing the route to the facilities and map information relating the route. The priority setting unit is characterized further in updating the priority to a higher priority than before for setting to the parts selected by the parts selecting unit.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer readable storage medium having a computer readable program stored therein for causing a computer to perform a map data transmitting method, wherein the method comprises:

dividing the map data into figure parts constituting the map data and storing the figure parts included in the map data;

setting a priority of transmitting sequence to each of the figure parts stored at the storing; and transmitting the figure parts stored at the storing in the transmitting sequence according to the priority set at the setting, and wherein the setting includes a priority setting table for specifying a standard for setting the priority and dynamically sets the priority of transmitting sequence to each of the figure parts according to the priority setting table.

2. The computer readable storage medium of claim 1, wherein:

the map data transmitting method is a map data transmitting method for transmitting the map data to a moving object for guiding a route of the moving object; and the priority setting table is a priority setting table based on readability of route for setting a higher priority to a figure part which more improves readability of a guiding route of the moving object.

3. The computer readable storage medium of claim 2, wherein the priority setting table based on readability of route includes items of:
(1) a figure part for a road constituting the guiding route;
(2) a figure part for a road crossing the guiding route;
(3) a figure part for a road around the guiding route which does not cross the guiding route;
(4) a figure part for a traffic light on the guiding route;
(5) a figure part for facilities along the guiding route;
(6) a name for the road constituting the guiding route, a name of an intersection on the road constituting the guiding route, and a name for a building and facilities located around the guiding route;
(7) a figure part for a traffic light around the guiding route;
(8) background information around the guiding route; and
(9) a name for a road around the guiding route, a name for an intersection on the road around the guiding route, and a name for a building and facilities located around the road around the guiding route.

4. The computer readable storage medium of claim 1, wherein:
the map data transmitting method is a map data transmitting method for transmitting the map data to a moving object for guiding a route of the moving object; and
the priority setting table is one of a priority setting table based on distance from guiding route for setting a higher priority to a figure part which is located closer to the guiding route of the moving object and a priority setting table based on distance from present location of moving object for setting a higher priority to a figure part which is located closer to the present location of the moving object.

5. A map data transmitting apparatus for transmitting map data comprising:
a priority setting unit for setting a priority of transmitting sequence of the map data;
a transmitting unit for transmitting the map data by each of figure parts constituting the map data;
a data amount determining unit for determining a data amount which is a maximum value of transmittable amount of the data within a predetermined time; and
a parts selecting unit for selecting the figure parts to be transmitted according to the priority within the data amount, and wherein
the transmitting unit transmits the figure parts selected by the parts selecting unit in the transmitting sequence according to the priority.

6. The map data transmitting apparatus of claim 5, wherein:
the map data transmitting apparatus further comprises a traffic status detecting unit for detecting a traffic status of a transmission channel for transmitting the figure parts by the transmitting unit; and
the data amount determining unit dynamically changes the data amount according to a change of the traffic status in case the traffic status of the transmission channel detected by the traffic status detecting unit is changed.

7. The map data transmitting apparatus of claim 5, wherein:
the transmitting unit transmits the figure parts to a moving object for guiding a route of the moving object;
the map data transmitting apparatus further comprises a moving speed detecting unit for detecting a moving speed of the moving object; and the data amount determining unit dynamically changes the data amount according to a change of the moving speed in case the moving speed of the moving object detected by the moving speed detecting unit is changed.

8. The map data transmitting apparatus of claim 5, wherein:
the transmitting unit transmits the figure parts to a moving object for guiding a route of the moving object;
the map data transmitting apparatus further comprises a communication media detecting unit for detecting a kind of communication media of the moving object; and
the data amount determining unit dynamically changes the data amount according to a change of the kind of communication media in case the kind of communication media of the moving object detected by the communication media detecting unit is changed.

9. A map data transmitting apparatus for transmitting map data comprising:
a map database unit for dividing the map data into figure parts constituting the map data and for storing the figure parts includes in the map data;
a priority setting for setting a priority of transmitting sequence to each of the figure parts stored in the map database unit; and
a transmitting unit for transmitting the figure parts stored in the map database unit in the transmitting sequence according to the priority by the priority setting unit, and wherein
the priority setting unit includes a plurality of the priority setting tables for specifying a standard for setting the priority, selects one of the plurality of the priority setting tables and dynamically sets the priority of transmitting sequence to each of the figure parts according to the priority table selected.

10. The map data transmitting apparatus of claim 9, wherein:
the map data transmitting apparatus transmits the map data to a moving object; and
the priority setting unit dynamically sets the priority of transmitting sequence to each of the figure parts according to one of a priority setting table based on distance in moving direction for setting a higher priority to a figure part which is closer to a moving direction of the moving object and a priority setting table based on distance from route for setting a higher priority to a figure part which is located closer to the route on which the moving object is moving.

11. The map data transmitting apparatus of claim 9, wherein:
the map data transmitting apparatus is a map data transmitting apparatus for transmitting map data to a map data receiving apparatus having a display unit for displaying the map data and a scrolling indicating unit for indicating a scrolling direction and for scrolling the map data displayed on the display unit; and
the priority setting unit dynamically sets the priority of transmitting sequence to each of the figure parts according to a priority setting table based on scrolling direction for setting a higher priority to a figure part which is located closer to the scrolling direction indicated by the scrolling indicating unit.

12. A map data transmitting apparatus for transmitting map data for guiding a route of a moving object comprising:
a route guiding request detecting unit for detecting a request for guiding the route from the moving object;

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of transmitting sequence to each of the figure parts according to the request for guiding the route from the moving object in case the route guiding request detecting unit detects the request for guiding the route.

13. The map data transmitting apparatus of claim 12, wherein the priority setting unit sets a higher priority to the figure part for a point which is located at a place easier to reach from a present location of the moving object.

14. A map data transmitting apparatus for transmitting map data for guiding a route of a moving object comprising:

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of transmitting sequence to each of the figure parts according to a priority setting table based on readability of route for setting a higher priority to a figure part which more improves readability of guiding route of the moving object.

15. The map data transmitting apparatus of claim 14, wherein the priority setting table based on readability of route includes items of:

(1) a figure part for a road constituting the guiding route;
(2) a figure part for a road crossing with the guiding route;
(3) a figure part for a road around the guiding route which does not cross the guiding route;
(4) a figure part for a traffic light on the guiding route;
(5) a figure part for facilities along the guiding route;
(6) a name for the road constituting the guiding route, a name of an intersection on the road constituting the guiding route, and a name for a building and facilities located around the guiding route;
(7) a figure part for a traffic light around the guiding route;
(8) background information around the guiding route; and
(9) a name for a road around the guiding route, a name for an intersection on the road around the guiding route, and a name for a building and facilities located around the road around the guiding route.

16. A map data transmitting apparatus for transmitting map data comprising:

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit includes a plurality of the priority setting tables for specifying a standard for setting the priority, arbitrarily combines at least two of the plurality of the priority setting tables and dynamically sets the priority of transmitting sequence to each of the figure parts.

17. A map data transmitting apparatus for transmitting map data for guiding a route of a moving object comprising:

a map database unit for dividing the map data into figure parts constituting the map data and for storing the figure parts included in the map data a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein:

the transmitting unit comprises a traffic status detecting unit for detecting a traffic status of a transmission channel for transmitting the figure parts to the moving object by the transmitting unit; and the priority setting unit dynamically sets the priority of transmitting sequence to each of the figure parts according to a change of the traffic status in case the traffic status of the transmission channel detected by the traffic status detecting unit is changed.

18. A map data transmitting apparatus for transmitting map data for guiding a route of a moving object comprising:

a moving speed detecting unit for detecting a moving speed of the moving object;

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of transmitting sequence to each of the figure parts according to a change of the moving speed in case the moving speed of the moving object detected by the moving speed detecting unit is changed.

19. A map data transmitting apparatus for transmitting map data for guiding a route of a moving object comprising:

a communication media detecting unit for detecting a kind of communication media of the moving object;

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of the transmitting sequence to each of the figure parts according to a change of the kind of communication media in case the kind of communication media of the moving object detected by the communication media detecting unit is changed.

20. A map data transmitting apparatus for transmitting map data for guiding a route of a moving object comprising:

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of transmitting sequence to each of the figure parts according to a priority setting table based on distance from guiding route for setting a higher priority to a figure part which is located closer to the guiding route of the moving object.

21. A map data transmitting apparatus for transmitting map data for guiding a route of a moving object comprising:

a map database unit for dividing the map data into figure parts constituting the map data and for storing the figure parts included in the map data;

a priority setting unit for setting a priority of transmitting sequence to each of the figure parts stored in the map database unit; and a transmitting unit for transmitting the figure parts stored in the map database unit in the transmitting sequence according to the priority by the priority setting unit, and wherein the priority setting unit dynamically sets the priority of transmitting sequence to each of the figure parts according to a priority setting table based on distance from specific point for setting a higher priority to a figure part which is located closer to the specific point in the map data.

22. A computer readable storage medium having a computer readable program stored therein for causing a computer to perform a map data transmitting method for transmitting the map data to a moving object for guiding a route of the moving object, wherein the method comprises:

dividing the map data into figure parts constituting the map data and storing the figure parts included in the map data;

setting a priority of transmitting sequence to each of the figure parts stored at the storing; and transmitting the figure parts stored at the storing in the transmitting sequence according to the priority set at the setting, and wherein the setting sets a higher priority to a figure part for a point which is easier to access from the present location of the moving object.

* * * * *